(12) United States Patent
Khojastepour et al.

(10) Patent No.: US 9,184,902 B2
(45) Date of Patent: Nov. 10, 2015

(54) INTERFERENCE CANCELLATION FOR FULL-DUPLEX COMMUNICATIONS

(71) Applicant: NEC Laboratories America, Inc., Princeton, NJ (US)

(72) Inventors: Mohammad Khojastepour, Lawrenceville, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 302 days.

(21) Appl. No.: 13/869,775

(22) Filed: Apr. 24, 2013

(65) Prior Publication Data

US 2013/0286903 A1    Oct. 31, 2013

Related U.S. Application Data

(60) Provisional application No. 61/638,239, filed on Apr. 25, 2012.

(51) Int. Cl.
| | |
|---|---|
| *H04L 5/14* | (2006.01) |
| *H04L 5/00* | (2006.01) |
| *H04B 1/12* | (2006.01) |
| *H04B 1/525* | (2015.01) |
| *H04L 25/02* | (2006.01) |
| *H04L 27/26* | (2006.01) |

(52) U.S. Cl.
CPC ........ *H04L 5/14* (2013.01); *H04B 1/123* (2013.01); *H04B 1/525* (2013.01); *H04L 5/0048* (2013.01); *H04L 5/143* (2013.01); *H04L 5/1461* (2013.01); *H04L 25/0228* (2013.01); *H04L 27/2647* (2013.01)

(58) Field of Classification Search
None
See application file for complete search history.

(56) References Cited

U.S. PATENT DOCUMENTS

| | | | | |
|---|---|---|---|---|
| 2004/0203458 | A1* | 10/2004 | Nigra | 455/67.13 |
| 2011/0216813 | A1* | 9/2011 | Baldemair et al. | 375/211 |

OTHER PUBLICATIONS

J. Choi, M. Jain, K. Srinivasan, P. Levis, and S. Katti. Achieving single channel, full duplex wireless communication. In Proceedings of ACM MobiCom, Sep. 2010.
M. Duarte, C. Dick, and A. Sabharwal. Experiment-driven characterization of full-duplex wireless systems. Avaiable at: http://warp.rice.edu/trac/wiki/TransWireless2011_FullDuplex.
M. Jain, T.M. Kim, D. Bharadia, S. Seth, K. Srinivasan, P. Levis, S. Katti, and P. Sinha. Practical, real-time, full duplex wireless. In Proceedings of ACM MobiCom, Sep. 2011.
M. A. Khojastepour, K. Sundaresan, S. Rangarajan, X. Zhang, and S. Barghi. The case for antenna cancellation for scalable full duplex wireless communications. Tenth ACM Workshop on Hot Topics in Networks (HotNets—X) Nov. 14-15, Cambridge, MA.
M. Knox. Self-jamming Cancellation Networks for Full Duplex Communication. PHD Thesis, Polytechnic University, 2008.

* cited by examiner

*Primary Examiner* — Donald Mills
(74) *Attorney, Agent, or Firm* — Joseph Kolodka

(57) ABSTRACT

A communications apparatus used in a wireless full duplex system is disclosed. The communications apparatus includes a receiver chain connected to an antenna and an interference cancelling chain. One or more cancellation signals generated by the interference cancelling chain are fed back to the receiver chain prior to the first baseband amplifier which uses the first automatic gain control and the second automatic gain controller. Other methods and systems also are disclosed.

17 Claims, 14 Drawing Sheets

INTERFERENCE CANCELLATION FOR FULL-DUPLEX COMMUNICATIONS

This application claims the benefit of U.S. Provisional Application No. 61/638,239, entitled "Wideband Digital Cancellation for Full-Duplex Communications," filed on Apr. 25, 2012, the contents of which are incorporated herein by reference.

BACKGROUND OF THE INVENTION

The present invention relates to wireless full-duplex communications and more particularly to interference cancellation for full-duplex communications.

We consider the problem of canceling self-interference received by a wireless node from the transmitted signal from the same node. The self-interference signal is partly known to the transmitter with the exception of the channel gain and multipath effect. We investigate the limitation of digital cancellation in solving the problem of self-interference cancellation and seek efficient algorithms that can be used in wideband and frequency selective channels as well as the narrowband and frequency flat channels. We show that limitations of analog to digital converters (ADC) such as the dynamic range and quantization resolution are the main obstacle in restricting the isolation levels of the self-interference signal that can be achieved by employing digital cancelation. We provide design guidelines and a specific digital cancelation system with an enhanced effective resolution and larger dynamic range by feeding back the canceling signal prior to analog to digital conversion. We also address the problem of wideband digital cancellation by using the theory of sparse signal recovery.

The transmission and reception in the current commercial wireless communication systems occurs in orthogonal resource blocks (RB) where a resource block indicates a particular division of space, frequency, and time. In particular, the cellular systems are designed such that uplink and downlink transmissions work in orthogonal time, i.e., time division duplex (TDD) systems, or frequency division duplex (FDD) systems. Due to the orthogonality constraint between the resource blocks for transmission and reception from any network terminals, e.g., the base stations or relays, the system works in so called half duplex (HD) mode. A full-duplex wireless device is one that can transmit and receive at the same time in the same frequency band and typically requires at least one Tx and one Rx antenna. The key challenge in realizing such a device lies in the Self-Interference (SI) generated by the Tx antenna at the Rx antenna. As an example, consider a WiFi signal with a transmit power of 20 dBm. A Tx-Rx antenna separation of about 6-8 inches results in a path loss of about 40 dB (depending on channel characteristics), resulting in a self-interference of at least −20 dBm. With a noise floor around −93 dBm, one would further require a self-interference cancellation of at least 73 dB to be able to decode the desired received signal. While one can solely employ digital interference cancellation techniques, current analog to digital converters (ADC's) do not have a resolution to pass a received signal which is 73 dB less than the noise floor. Hence, several practical full duplex (FD) systems [1, 2, 3] have been proposed that couple RF cancellation along with digital cancellation to achieve the desired level of SI suppression.

Digital noise cancellation has been vastly addressed in the literature in the context of active noise cancellation where it is particularly designed for reducing the acoustic noise by generating interfering signals that enables cancellation of an unwanted signal at a particular location. In spite of the similarity of active noise cancellation and self-interference cancellation for the purpose of wireless full duplex communication there are subtle differences between the two problems:

Firstly, in the problem of active noise cancellation, the unwanted signal is not known and only a statistical model of the signal is assumed to be known. An example of such signals is the noise generated by the propeller of an airplane or helicopter, the noise generated by the engine of the airplane or a car in steady motion, etc. The road noise in an automobile generated by the tires is also another example of such signal.

The second difference is that the signal has to be generated and then propagated in the air to reach the desired location where the null is intended. Therefore, due to the considerable delay in propagation of acoustic signals over the distance, it is required that the future value of a signal be predicted rather than the current value of the signal. In contrast, in self-interference cancellation the interfering signal is known and given the fast propagation of the electromagnetic signals, prediction of its future value is not an issue in this context. However, the power of self interference is comparable or much higher than (say 10 dB to 40 dB) that of the intended signal. Moreover, the intended signal has the same carrier frequency and therefore it is not practical to null a particular frequency. For example, consider a narrow band system with 10 kHz bandwidth at a center frequency of 2.4 GHz. At the receiver, the self-interference signal could be a modulated cosine wave with phase difference $\Phi 1$ and amplitude A1 while the intended signal is different only in phase and amplitude, say $\Phi 2$ and A2, respectively. Therefore by considering only a narrowband signal it is impossible to figure out the self-interference component from the received signal unless if the phase and amplitude of the self-interference is available a priori. However, for a wideband system the situation is different and the signature of the self-interference signal over different tones may be used for resolving this issue.

RF cancellation can include a combination of antenna cancellation and analog cancellation. In [1], antenna cancellation was achieved by placing two Tx antennas asymmetrically at l and l+($\lambda$/2) distance from the Rx antenna, thereby allowing the transmit signals to add $\pi$ out of phase and hence cancel each other. On the other hand, analog cancellation involves generation of the $\pi$ phase shift internally, coupled with the estimation and compensation of the SI channel [2, 3]. This allows for it phase shifters with a better frequency response over a wide-band channel (e.g., BALUN in [3]) to be employed, in contrast to the strong dependence on frequency ($\lambda$) posed by the antenna cancellation in [1]. While the existing schemes employ at least two antennas, one can also envision FD with a single antenna [5], where a circulator is used to isolate the Tx and Rx signals. However, owing to the lack of path loss attenuation and the lack of contribution from RF cancellation, the required level of SI cancellation is significantly higher and hence hard to realize.

Current work on self-interference cancellation have considered four types of cancellations (i) Active noise cancellation in the air for example by using transmit antenna cancellation [1], (ii) Active noise cancellation in RF circuits and transmission lines for example by using receive antenna cancellation [4], (iii) Passive noise cancellation with analog noise canceler circuits [5], and (iv) Passive noise cancellation with digital noise canceler algorithms [2].

[1] J. Choi, M. Jain, K. Srinivasan, P. Levis, and S. Katti. Achieving single channel, full duplex wireless communication. In Proceedings of ACM MobiCom, September 2010.

[2] M. Duarte, C. Dick, and A. Sabharwal. Experiment-driven characterization of full-duplex wireless systems. Avaiable at: http://warp.rice.edu/trac/wiki/TransWireless2011_FullDuplex.

[3] M. Jain, T. M. Kim, D. Bharadia, S. Seth, K. Srinivasan, P. Levis, S. Katti, and P. Sinha. Practical, real-time, full duplex wireless. In Proceedings of ACM MobiCom, September 2011.

[4] M. A. Khojastepour, K. Sundaresan, S. Rangarajan, X. Zhang, and S. Barghi. The case for antenna cancellation for scalable full duplex wireless communications. Tenth ACM Workshop on Hot Topics in Networks (HotNets-X) November 14-15, Cambridge, Mass.

[5] M. Knox. Self-jamming Cancellation Networks for Full Duplex Communication. PHD Thesis, Polytechnic University, 2008.

We address the problem of digital cancelation of self-interference signal. While digital cancellation alone cannot provide the required isolation for the self-interference between the transmit to the receive RF chains, it is essential component and plays a unique role in enabling full-duplex systems. The problem with multipath and wideband signals is very hard to address in analog domain mainly due to the fact that wideband RF components are very hard to design, and design of multi stage cancelation circuits to cancel out the effect of different signal paths would be very expensive to build and hard to adjust. However, in digital domain, the main requirement is the resolution and dynamic range of ADC; processing in digital domain in order to generate wideband canceling signal is much simpler, less expensive, and efficient. We apply the theory of compressed sensing in order to find the solution to the problem of sparse channel impulse recovery for the purpose of self-interference cancelation.

We provide design guidelines as how to adjust or choose ADC parameters in order to meet particular SINR in the digital domain. We also provide efficient designs and algorithms that can be used in wideband and frequency selective channels as well as the narrowband and frequency flat channels. We show that limitations of analog to digital converters (ADC) such as the dynamic range and quantization resolution are the main obstacle in restricting the isolation levels of the self-interference signal that can be achieved by employing digital cancelation. We provide particular cancellation scenarios and system block diagrams with an enhanced effective resolution and larger dynamic range by feeding back the canceling signal prior to analog to digital conversion. We also provide new scheme for solving the problem of wideband digital cancellation by employing ideas from the theory of sparse signal recovery.

The "DETAILED DESCRIPTION" is organized as follows. In Section 1, we discuss the limits of digital noise cancellation due to the performance limitation of ADC. In Section 2, we discuss the problem of self-interference cancellation and the approach we take to solve this problem. In Section 3, we explain the channel estimation problem for the purpose of digital noise cancellation. We describe the relation between the channel estimation and sparse signal recovery problems in Section 4. We provide specific algorithms for channel estimation based on the compressed sensing algorithm in Section 5. We discuss the generation of the self-cancelation signals under different scenarios in Section 6. We provide further simulation results in Section 7. Finally, conclusion is described in Section 8.

BRIEF SUMMARY OF THE INVENTION

An objective of the present invention is to cancel self-interference received by a wireless node from the transmitted signal from the same node.

An aspect of the present invention includes a communications apparatus used in a wireless full duplex system, the communications apparatus comprising a receiver chain connected to an antenna and an interference cancelling chain. The receiver chain includes a first baseband amplifier to amplify a receive I (in phase) signal in a receive I (in phase) path, a second baseband amplifier to amplify a receive Q (quadrature) signal in a receive Q (quadrature) path, a first analog-to-digital (A/D) converter to convert an output of the first baseband amplifier, a second analog-to-digital (A/D) converter to convert an output of the second baseband amplifier, a first automatic gain controller to control the first baseband amplifier, and a second automatic gain controller to control the second baseband amplifier. The interference cancelling chain includes a first digital-to-analog converter to convert a cancelling I (in phase) signal in a cancelling I (in phase) path, a second digital-to-analog converter to convert a cancelling Q (quadrature) signal in a cancelling Q (quadrature) path, a third baseband amplifier to amplify an output of the first digital-to-analog converter, and a fourth baseband amplifier to amplify an output of the second digital-to-analog converter. One or more cancellation signals generated by the interference cancelling chain are fed back to the receiver chain before the first automatic gain control and the second automatic gain control.

Another aspect of the present invention includes a method implemented in a communications apparatus used in a wireless full duplex system. The method includes, in a receiver chain connected to an antenna, amplifying, with a first baseband amplifier, a receive I (in phase) signal in a receive I (in phase) path, amplifying, with a second baseband amplifier, a receive Q (quadrature) signal in a receive Q (quadrature) path, converting, with a first analog-to-digital (A/D) converter, an output of the first baseband amplifier, converting, with a second analog-to-digital (A/D) converter, an output of the second baseband amplifier, controlling, with a first automatic gain controller, the first baseband amplifier, and controlling, with a second automatic gain controller, the second baseband amplifier. The method includes, in an interference cancelling chain, converting, with a first digital-to-analog converter, a cancelling I (in phase) signal in a cancelling I (in phase) path, converting, with a second digital-to-analog converter, a cancelling Q (quadrature) signal in a cancelling Q (quadrature) path, amplifying, with a third baseband amplifier, an output of the first digital-to-analog converter, and amplifying, with a fourth baseband amplifier, an output of the second digital-to-analog converter. One or more cancellation signals generated by the interference cancelling chain are fed back to the receiver chain before the first automatic gain control and the second automatic gain control.

DETAILED DESCRIPTION

Figure 1:
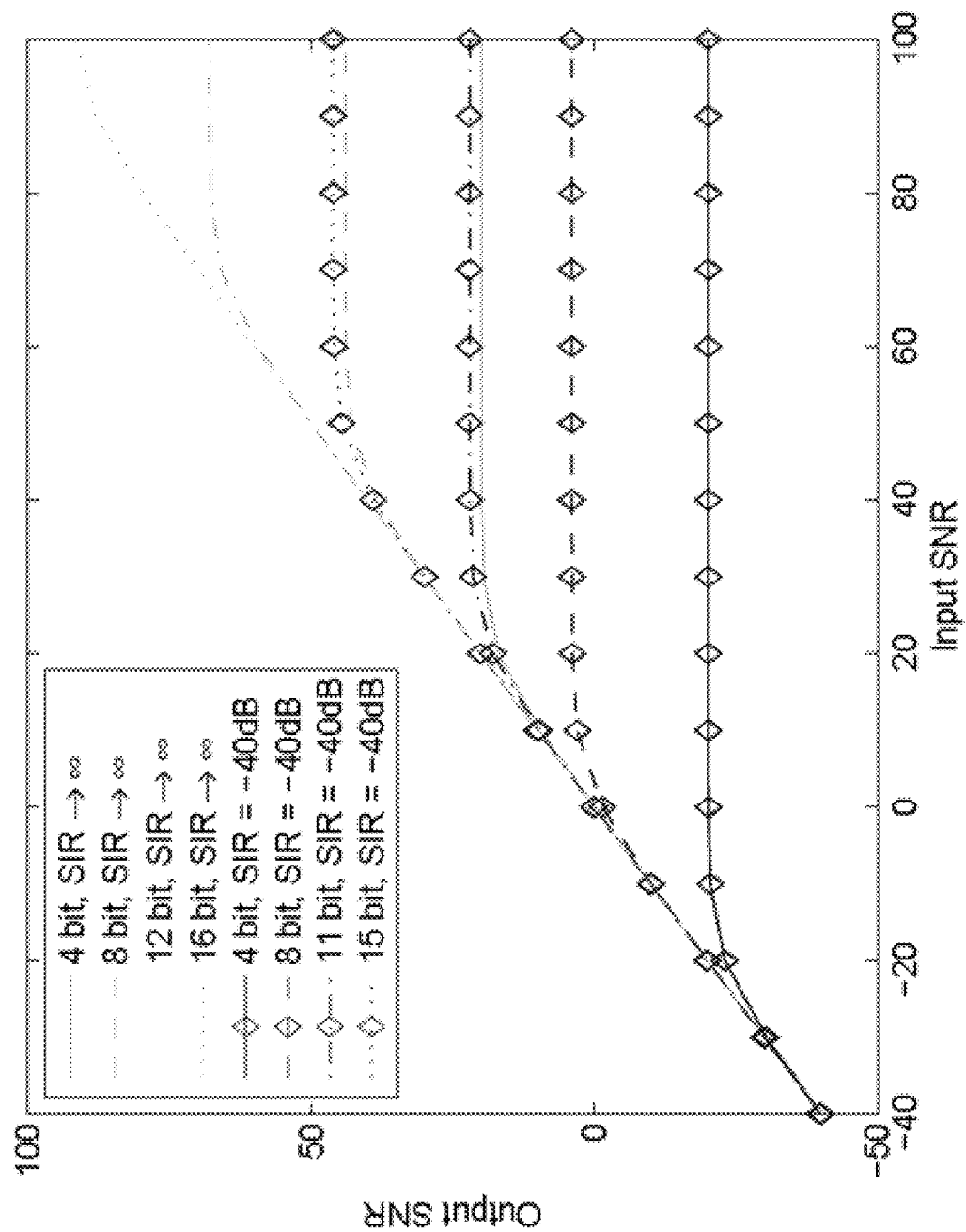
FIG. 1 depicts output SNR versus input SNR as a function of number of ADC bits and self-interference power.

We consider the problem of canceling self-interference received by a wireless node from the transmitted signal from the same node. The self-interference signal is partly known to the transmitter with the exception of the channel gain and multipath effect. We investigate the limitation of digital cancellation in solving the problem of self-interference cancellation and seek efficient algorithms that can be used in wideband and frequency selective channels as well as the narrowband and frequency flat channels. We show that limitations of analog to digital converters (ADC) such as the dynamic range and quantization resolution are the main obstacle in restricting the isolation levels of the self-interference signal that can be achieved by employing digital cancelation. We provide design guidelines and a specific digital cancelation system with an enhanced effective resolution and larger dynamic range by feeding back the canceling signal prior to analog to digital conversion. We also address the problem of wideband digital cancellation by using the theory of sparse signal recovery.

The problem with multipath and wideband signals is very hard to address in analog domain mainly due to the fact that wideband RF components are very hard to design, and design of multi stage cancelation circuits to cancel out the effect of different signal paths would be very expensive to build and hard to adjust. However, in digital domain, the main requirement is the resolution and dynamic range of ADC; processing in digital domain in order to generate wideband canceling signal is much simpler, less expensive, and efficient. We apply the theory of compressed sensing in order to find the solution to the problem of sparse channel impulse recovery for the purpose of self-interference cancelation. Another advantage of our invention is that it can achieve much better isolation for the SI signal. This is partly due to our system design (block diagrams in FIGS. 5 and 6) and partly due to the efficiency of the canceling algorithms designed for wideband signals.

1 Digital Noise and Performance of Digital Cancellation

The performance of digital cancellation techniques for enabling full duplex communication is highly restricted by the amount of digital noise and dynamic range of the analog to digital converters. Analog to digital conversion affects the performance in multiple ways. If automatic gain control (AGC) is not used, the saturation or overload distortion causes very severe signal modification by losing the actual amplitude as well as introduction of new harmonics which can completely change the frequency response of the receiver. The saturation can be roughly measured by the saturation noise power $N_{sat}$ defined as $$N_{sat} = \int_{-\infty}^{Y_m}(y-Y_m)^2 f(y)dy + \int_{Y_M}^{\infty}(y-Y_M)^2 f(y)dy \quad (1)$$

where f(y) is the probability distribution function of received signal y at the input of the ADC, $Y_m$ is the minimum input signal and $Y_M$ is the maximum input signal to the ADC. Meanwhile, the quantization error of the ADC is defined as the mean square error of the quantized signal where the signal is within the range of the ADC $$N_Q = \int_{Y_m}^{Y_M}(y-[y])^2 f(y)dy \quad (2)$$

where [y] indicates the quantized value of y. Usually when saturation occurs the effect is so destructive that the term $N_Q$ in total quantization error $$N_{QT} = \int_{-\infty}^{\infty}(y-[y])^2 f(y)dy = N_{sat} + N_Q \quad (3)$$

can be ignored.

If AGC is used, then the peak of the signal would be confined within the range $(-Y_m, Y_M)$. This of course depends on the distribution of the input amplitude. For example, a signal y with unlimited distribution, say Gaussian distribution, cannot be scaled to fit within limited range of ADC. However, in practice limiting the signal to $4\sigma_y$, where $\sigma_y$ is the standard deviation of the input distribution, makes 93.6% of the input samples to be within the desired range. For an ADC with symmetric range we have $-Y_m = Y_M = 4\sigma_y$.

In general, the notion of quantization error is not an indicator of actual system performance degradation indicated by signal to noise ratio (SNR) or bit error rate (BER). The main reason is that even though sampling the signal can preserve the information about the signal (as long as they are band limited and have been sampled with enough high resolution), digitization of the sampled signal generates new harmonics, loses the information about the signal amplitude, and changes the power spectrum of the input signal. The effect of digitization can be understood though statistical analysis. Similar to the perfect reconstruction result in discrete signal processing related to the sampling of a signal in time, a fundamental result in the statistical theory of digital signal processing provides the condition for perfect reconstruction of a quantized amplitude signal. With uniform digitization and equal quantization steps, if the characteristic function of the input signal is bandlimited, i.e., it is nonzero only within the range $$\left(-\frac{\pi}{\Delta}, \frac{\pi}{\Delta}\right)$$

where $\Delta$ is the quantization step, then the pdf of the input signal can be derived from the pdf of the output signal; yet it is impossible to recover the actual instance of the input signal from the output signal.

Under the conditions that the quantization error sequence $y-[y]$ is (i) stationary, (ii) uniformly distributed, (iii) uncorrelated with y, and (iv) white-noise process, we can simplify the calculation of $N_Q$. For practical systems with relaxed definition, these conditions are met with good approximation when the number of quantization bits grows large and the signal y is a complex sigal such as voice, or baseband transmitted signals in wireless communication systems.

In practice, the role of AGC is very important. AGC usually works by providing a feedback of the average signal power to a linear RF amplifier that is capable of adjusting the signal power within the desired range that depends on the ADC specifications such as dynamic range and sensitivity. Therefore, while AGC tries to amplify the RF signal prior to feeding it into the ADC with the largest possible gain in order to reduce the quantization noise—$N_Q$, it should carefully restrict the amplification gain in order to avoid saturation noise $N_{sat}$. Considering that the feedback is based on the average signal power but the saturation happens at the signal peak, the adjustment of AGC depends on the peak to average power ratio of the signal ($\eta$). For a pure single tone sinusoid signal the peak to average power ratio is 2 and in practice the value of $\eta=4$ provides a good approximation of the peak to average power ratio for wideband signal with additive Gaussian noise.

We can obtain the relationship between the SNR at the output and input of ADC as follows. Let S, I, and N represent the power of the desired signal, self interference, and noise (the sum of thermal noise and possible in-band interference from other sources in the system). As discussed, the AGC gain is set to exploit the full scale range of the ADC; we assume $$\eta(S+I+N)=X_M^2 \quad (4)$$

Although both N and I have in-band component with the desired signal S, we assume they are uncorrelated sources and hence their power is additive. Also, in the above expression we assumed symmetric range for ADC. The total noise power at the output of the ADC is $$N_T=N+N_{QT}=N+N_{sat}+N_Q \quad (5)$$

If saturation does not happen, i.e., $N_{sat}=0$, the SNR at the output of the ADC, $$SNR_o = \frac{S}{N_T},$$

is given by $$SNR_o = \frac{S}{N_T} = \frac{1}{\frac{1}{SNR_i} + \frac{N_Q}{S}} \quad (6)$$

where $$SNR_i = \frac{S}{N}$$

is the SNR at the input of the ADC. For uniform distribution of the quantization noise we have $$N_Q = \frac{\Delta^2}{12}, \Delta = \frac{2X_M}{2^b} \quad (7)$$

where b is the number of quantization bits and $2X_M$ is the full scale range of the ADC. From (4) and (7), we have $$N_Q = \frac{\eta(S+I+N)}{3(2^{2b})} \quad (8)$$

Substituting in (6) we have $$SNR_o = \frac{1}{\frac{1}{SNR_i} + \frac{\eta}{3(2^{2b})}\left(1 + \frac{1}{SNR_i} + \frac{1}{SIR_i}\right)} \quad (9)$$

where $$SIR_i = \frac{S}{I}$$

is the ratio of power of the intended signal to the power of the self interference at the input of the ADC.

FIG. 1 depicts the output SNR versus input SNR for various number of quantization bits while SIR either goes to infinity (which means no self interference exists) or SIR equals a typical value −40 dB. It is observed that an AGC with almost twice the number of bits are required when SIR=−40 dB to achieve the same quantization performance in comparison to the ideal case without self interference.

Figure 2:
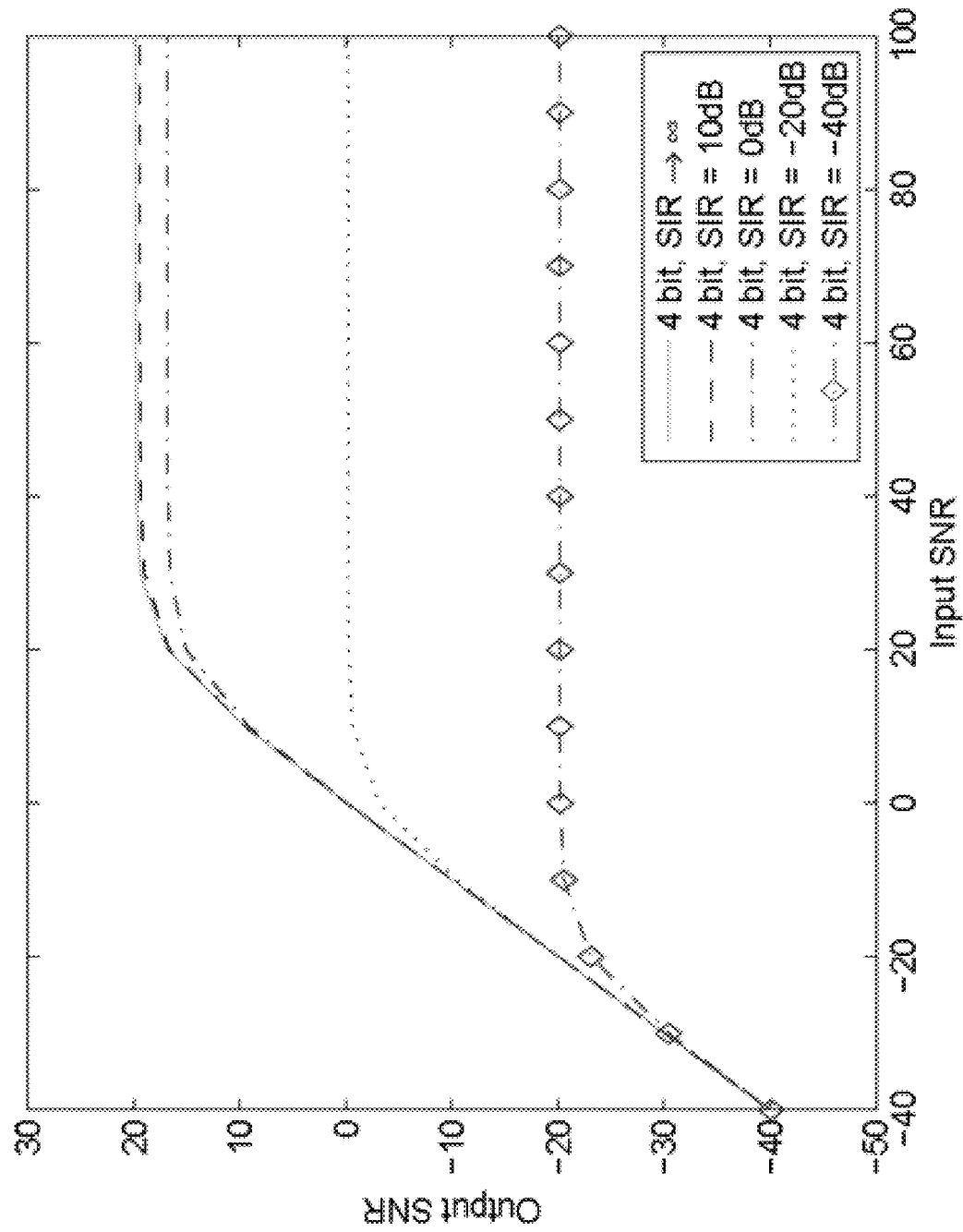
FIG. 2 depicts an effect of SIR on the performance of ADC.
Figure 3:
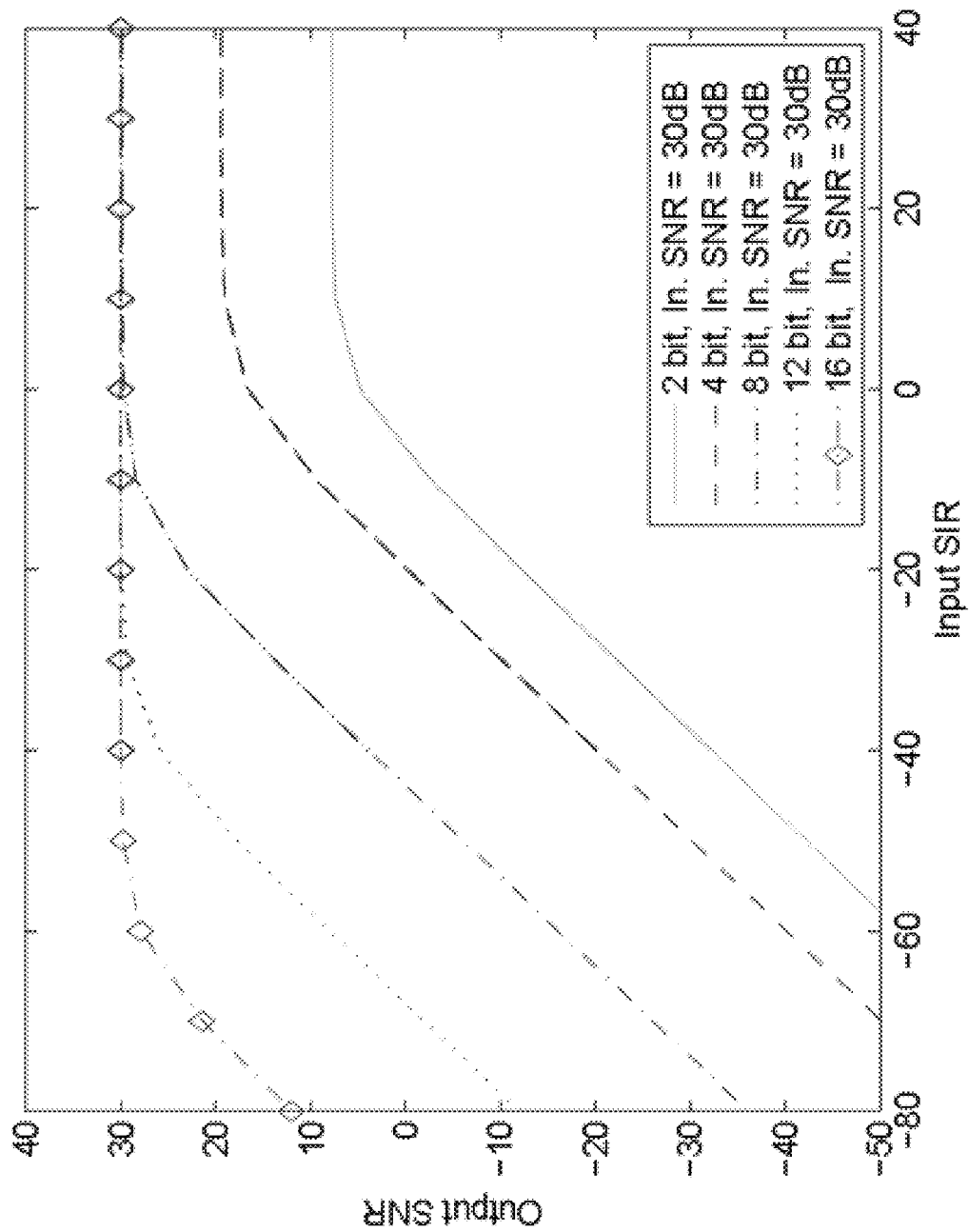
FIG. 3 depicts output SNR versus input SIR as a function of number of ADC bits.

However, requirement of SIR is somewhat loose and a typical value of 10 dB-20 dB for SIR provides almost the same performance as the ideal case of SIR→∞. FIG. 2 illustrates that less than 0.5 dB and 4 dB degradation in output SNR may occur for SIR equal to 10 dB and 0 dB, respectively. However, the SIR values below 0 dB result in considerable degradation in output SNR. We note that in this figure the number of quantization bits is kept constant for all curves.

In order to make sure that the output SNR of the ADC is not adversely affected, one should provision higher number of quantization bits based on the typical range of the input SIR. For example, if a full duplex system is required to handle SIR in the range of −40 dB to −20 dB in order to take advantage of digital cancellation, the system must exploit a ADC with 16 bit quantization. This theoretical value usually is a lower bound and in practice higher resolution is required. For example, although FIG. 1 predicts that about 5 to 6 bits are enough to handle signals in the range of 5 dB to 30 dB (for decoding BSPK modulated signals with rate ½ up to 64-QAM modulated signals with rate ¾) in practice much higher resolution is required to overcome the effect of non-ideal AGC, and distortions due to jitter.

2 Self-Interference Cancellation

Active noise cancellation has been vastly addressed in the literature particularly for reducing the acoustic noise by generating interfering signals that enables cancellation of an unwanted signal at a particular location. In spite of the similarity of active noise cancellation and Self-interference cancellation there are subtle differences between the two problems. Firstly, in the problem of active noise cancellation, the unwanted signal is not known and only an statistical model of the signal is assumed to be known. An example of such signals is the noise generated by the propeller of an airplane or helicopter, the noise generated by the engine of the airplane or a car in steady motion, etc. The road noise in an automobile generated by the tires is also another example of such signal. The second difference is that the signal has to be generated and then propagated in the air to reach the desired location where the null is intended. Therefore, due to the considerable delay in propagation of acoustic signals over the distance, it is required that the future value of a signal be predicted rather than the current value of the signal.

In contrast, in self-interference cancellation the interfering signal is known and given the fast propagation of the electromagnetic signals, prediction of its future value is not an issue in this context. However, the power of self interference is comparable or much higher than (say 10 dB to 40 dB) that of the intended signal. Moreover, the intended signal has the same carrier frequency and therefore it is not practical to null a particular frequency. For example, consider a narrow band system with 10 kHz bandwidth at a center frequency of 2.4 GHz. At the receiver, the self-interference signal could be a modulated cosine wave with phase difference $\phi 1$ and amplitude A1 while the intended signal is different only in phase and amplitude, say $\phi 2$ and A2, respectively. Therefore by considering only a narrowband signal it is impossible to figure out the self-interference component from the received signal unless if the phase and amplitude of the self-interference is available a priori. However, for a wideband system the situation is different and the signature of the self-interference signal over different tones may be used for resolving this issue.

We consider the design of static self-interference cancellation where the system tunes its performance only based on the self-interference and iterative processing of the cancellation algorithm without the presence of any other interferer or intended signal.

The iterative nature of the proposed algorithm allows for much higher cancellation of the self interference due to the fact that when the SIR at the input of the ADC increases, the SNR at the output of the ADC improves which in turn allows for better cancellation. This positive feedback could potentially work to the point that SIR reaches a threshold of about 10 dB beyond which output SNR of ADC is not much affected by SIR improvement though digital cancellation. Hence, if the goal of the digital cancellation is to decode, for example, a 16QAM signal with rate ¾ and require 20 dB SINR then the last 10 dB of interference cancellation has to come from the performance of the digital cancellation algorithm itself.

An important issue in estimation of the channel response of the self interference is the frequency resolution of the ADC or equivalently the sampling frequency of the ADC. Although in theory the Nyquist rate is the lower bound and hence it is possible to determine the position of the nulls much more precisely in analog domain, implementation of such a scheme in digital computers has considerable computational complexity and hence is prohibitive. As a result, the resolution of the position of the frequency response filter tap or time domain tap delays are directly determined and affected by the sampling frequency of the ADC. For example WARP boards use an ADC with 40 MHz sampling rate to sample signals up to 20 Mhz and each narrowband channel is 625 KHz. Hence the sampling resolution at 10 Mhz is only 4 sample per cycle while for the center band it is 64 samples per cycle which correspond to 5.6 degree phase resolution.

3 Self-Interference Channel Estimation

In order to cancel the self-interfering signal, we should first try to estimate it at the receiver. Even though the signal is known at the same node, the propagation through wireless medium and the combined effect of antenna pattern, polarization, and amplification causes the received signal to be different form the transmitted signal. In line of sight environments, where the assumption of near filed propagation holds between the transmit and receive antennas, the channel is usually flat and narrow band estimation of the channel is sufficient in order to regenerate the received signal and cancel it out by combining the generated signal and the actual received signal with $\pi$ radians out of phase.

The indoor fading channel characteristics are usually very different from that of outdoor where the assumption of line of sight holds and the impulse response of the channel usually has a single dominant peak. In an stationary indoor environment, the channel impulse response usually has multiple peaks corresponding to each signal path that represent the delay and the amplitude of the corresponding path. Therefore, the channel is frequency selective and narrow band estimation of the channel between transmit and receive antennas does not provide the entire information about the channel. Therefore, signal cancellation techniques based on narrow band estimation would not be effective. Moreover, if the indoor environment is not stationary, the impulse response of the channel changes over time and depending on the coherence time one has to re-estimate the self-interference channel before performing cancellation. Considering re-estimation of the channel within the coherence time, the channel has to be estimated over its coherence bandwidth as well. Such channel estimation relies on the transmission of a (time domain) signal where the pilot signals are in fact spreading in frequency domain. OFDM is an approach with relatively low computational complexity that takes advantage of low computational complexity of the fast fourier transform. Channel estimation for OFDM systems is traditionally approached in the frequency domain by estimating the frequency response for a few selected subcarriers and using those observations to interpolate the rest of the subcarriers. With this approach, the number of pilots required depends on the coherence bandwidth of the channel; the larger the bandwidth, the more the number of pilots required. However, this approach takes into account only the length of the impulse response and ignores the sparsity of the wireless channel. Wireless channels are typically sparse, i.e. the time domain impulse response of the channel typically has very few nonzero taps, i.e., the largest tap delay is usually much greater than the number of nonzero taps.

Channel sparsity is attractive from a system design perspective since it can be exploited to design more efficient channel estimation strategies. A recent result on compressed sensing shows that a discrete time signal of length M with only T nonzero coefficients can be exactly reconstructed from just observing any 2T samples of its discrete Fourier transform (DFT) if M is prime. Notice that the number of observations required does not depend on the DFT size M. This result has a direct application in our problem. Due to the importance of generating well suited canceling signal we would like to increase the frequency resolution and hence we exploit large number of subcarriers. Due to the small symbol duration, the length of the discrete time channel response will be large while there may be only very few nonzero coefficients. In this scenario, only very few subcarrier pilots are required to estimate the frequency response for all subcarriers. Moreover, the sparse channel estimation technique tries to estimate the time domain impulse response of the channel directly. Therefore, it is more suitable to generate the canceling signal in time domain from the estimated time domain tap positions and their gains.

While the result is remarkable. the proposed optimal signal recovery principle is combinatorial in nature. It is essentially an exhaustive search over all possible choices that give rise to the given observations under the sparsity constraint. To avoid this problem, based on L1-norm minimization is proposed. Some authors employ this algorithm for channel recovery in SISO OFDM systems where the observations are corrupted with noise. These results indicate the scope for potential improvement in wireless channel estimation problems by using the theory of sparse signal recovery where the system model is not necessarily ideal due to noise and M being non-prime in general. There have been many works on sparse signal recovery. The most notable one is the matching pursuit algorithm. The algorithm iteratively identifies a small subset of the nonzero positions, that contribute to most of the energy in the observations. Although the algorithm is suboptimal and greedy in nature, it is efficient in terms of performance and complexity. There are many variants of the algorithm depending on the way the positions are identified. In addition to matching pursuit, algorithms based on gradient search have also been proposed for sparse signal recovery.

We take advantage of the well-studied theory of sparse signal recovery for application in digital cancellation of wideband self-interference signal in order to enhance the SNR in full-duplex systems.

4 Channel Estimation Using Sparse Signal Recovery

We consider a multipath environment with T clusters or scatterers. The impulse response between the ith transmitter and jth receiver is modeled as $$h_{ji}(\tau, t) = \sum_{p=1}^{T} \alpha_p^{ji}(t) \delta(\tau - \tau_p(t) T_s) \quad (10)$$

where $\alpha_p(t) \in C$ and $\tau_p(t) \in R^+$ are the magnitude and the delay for path p, respectively, and $T_s$ is the sampling interval of the system. Notice that $\tau_p(t)$ need not be an integer. With block-fading channel assumption where the channel parameters are constant over a block and assuming perfect symbol level synchronization, the equivalent discrete time channel between transmit antenna i and receive antenna j can be modeled $$h_{ji}(n) = \sum_{p=1}^{T} \alpha_p^{ji} g((n - \tau_p) T_s) \quad (11)$$

where g(t) represents the effect of the pulse shaping filter and the RF front-ends at both the transmitter and the receiver.

It can be noted that to increase the resolution of ADC, $T_s$ is very small compared to the maximum delay spread in (11) which results in a channel with very few nonzero taps. For a raised-cosine filter with excess bandwidth of 0.5 or greater, the above channel will have approximately T non-negligible taps.

For the system model, we consider a cyclic prefix based OFDM system with pilot added channel estimation. Let M be the size of the FFT operations in the system, $n_t$ be the number of transmit antennas and $n_r$ be the number of received antennas. The channel estimation procedure consists of the following protocol. The training phase spans $n_t$ OFDM symbols. We assume that the channel remains constant over the duration of the training phase. In the first slot, the first transmit antenna sends pilots in $Q_1$ subcarriers. The remaining $M-Q_1$ subcarriers are either empty or may be used for data transmission in dynamic systems where self-interference channel has to be re-estimated while the transmission is in progress. Please note that we assume no other sources transmit on the subcarriers that are used for pilot transmission, i.e., those subcarriers are interference free for the purpose of self-interference estimation. In the second slot, the second transmit antenna sends pilots in $Q_2$ subcarriers. This procedure is followed until transmit antenna $n_t$ sends $Q_{n_t}$ pilots. The set of pilots chosen for the transmit antennas reed not be the same. The received pilots at receive-antenna j during the mth training slot is given by $$b_{jm} = \sqrt{P_m} S_m F h_{jm} + n_j, m - 1, 2, \ldots, n_t, j = 1, 2, \ldots, n_r \quad (12)$$
$$= A_m h_{jm} + n_j$$

where $h_{jm}$ is the M×1 vector representing the channel between mth transmit antenna and jth receive antenna, F is the M×M DFT matrix whose entry corresponding to the pth row and qth column is given by $$\exp\left(-j \frac{2\pi}{M} pq\right),$$

$S_m$ is the $Q_m \times M$ selection matrix that chooses the $Q_m$ rows of the DFT matrix according to the pilots chosen in the mth slot and the diagonal matrix $P_m$ is the power loading matrix that determines the power allocated to the pilot subcarriers. $n_{j \sim CN}$ (0, I) is the additive white Gaussian noise for the selected pilot tones.

It can be seen that the training stage entails a total of $\Sigma_{m=1}^{n_t} Q_m$ pilots to estimate $n_t n_r$ channels. We note that increasing the number of pilots may improve the mean squared error performance of the estimation, however, it comes at high cost of operation and computational complexity. Meanwhile, the increase in the number of pilots in dynamic systems adversely affect the overall throughput of the system and imposes high overhead to utilize full-duplex system. Such overhead may completely mask the gain of employing a full-duplex system. Nonetheless, there is a lower limit to the number of pilots that are in use beyond which the performance of the estimator sharply degrades. In the following we discuss this limitation.

4.1 Perfect Reconstruction Theory

The channel estimation problem considered in this work falls under the category of underdetermined system since we wish to estimate the response for a large number of subcarriers using a limited number of observations. We note that although OFDM channel estimation is used to find out the channel impulse response of the multipath self-interference channel, there is no limitation to necessarily use OFDM for the actual transmission. However, using OFDM for the actual data transmission would simplify the system and can also help in reducing the overhead of the channel estimation by concurrently transmitting pilot on particular subcarrier for the purpose of self-terference estimation while the rest of the OFDM tones can be used for the transmission of the actual data and control signal. Moreover, the same pilots can be used at the receiver of the user equipment (UE) and other nodes for estimating the channel between this full-duplex node and other nodes. In this case, only non-dedicated pilot structure can be used due to the fact that these pilots are intended for the estimation of multiple channels between different receivers and in particular for the self-interference channel between the transmitter and the receiver of the full-duplex node. Due to the importance of the estimation of self-interference channel, the pilot pattern should be tailored for the best performance in estimating the self-interference channel and hence it is recommended to have denser pilot pattern than the usually employed common reference signal patterns seen, for example, in LIE. Mathematically, we wish to determine the M×1 vector h from the Q×1 vector b=Ah where Q<M. In general, there are many solutions to this problem and h cannot be uniquely determined. However, if we impose the constraint that h has very few nonzero values, say T at most, then h can be uniquely reconstructed from b under certain conditions. Only 2T observations of the signal are required in the DFT domain to reconstruct the channel perfectly if the size of the DFT M is prime. It is further shown that the reconstruction problem is equivalent to the following optimization problem:

$$\min \|h\|_0 \text{ s.t. } Ah=b \tag{13}$$

where $\|h\|_0$ represents the L0-norm of the vector h.

The channel between different transmit and receive antennas of a full duplex node are usually correlated and may follow a certain structure in terms of the tap position and their respective gains and particularly due to the antenna coupling and the near field propagation. However, in this work, we do not employ such a relation and estimate each individual channel between each transmit-receive pair independently due to the sensitivity of the full-duplex system in generating precise canceling signal. Assuming a full duplex node with $n_t$ transmit and $n_r$ receive antennas, we use $2n_rT$ pilots to completely reconstruct the set of $n_tn_r$ channels between each transmit and receive antennas. In practice the use of L0-norm is not possible due to high computational complexity of determining the optimal solution. Moreover, when the observation is noisy the theoretical result on perfect recovery does not hold and one has to use a suboptimal algorithm to find a practically good solution. In the next section we consider suboptimal algorithm for sparse signal recovery.

5 Sparse Recovery Algorithms

In this section we discuss sparse recovery algorithms that could be used for self-interference channel estimation. Sparse recovery algorithms usually select the basis vectors based on a set of rules that can be applied sequentially to find out the elements of the basis set one by one, e.g., matching pursuit (MP) or orthogonal matching pursuit (OMP) or they can be applied in parallel. Some algorithm also use a combination of sequential and parallel algorithms by selecting multiple basis vectors at each step of a sequential algorithm. FOCUSS algorithm has multiple advantage in the problem of self-interference cancellation. First, the algorithm and the final solution is dependent on the initial condition which allows for prior knowledge to be incorporated into the solution. This is particularly useful when the channel changes has to be tracked. FOCUSS is also more suitable for the case where the basis vectors are selected from the columns of the FFT matrix due to the correlation between the basis vectors. However FOCUSS algorithm is computationally expensive. Sequential algorithms such as MP and OMP have considerably lower computational complexities due to their greedy nature. Since the number of nonzero tap in a typical wireless channel is between 6 to 18 in the bandwidth range of 5 MHz to 20 MHz, respectively, sequential algorithms can quickly and efficiently nd these taps. In the following we describe the algorithms in more detail.

5.1 FOCUSS Algoritm for MIMO Channel Estimation

We generalize the FOCUSS algorithm to make it applicable to MIMO channel estimation problems. Similar to L0-norm and its relaxation to L1-norm, the Lp-norm (0<p<1) can also be used to generate sparse solution while making the problem more tractable.

Our objective is to minimize the following sparsity measure:

$$J^{(p)}(\underline{h}) = \sum_{i=1}^{L} \left( \sum_{l=1}^{n_t} \sum_{r=1}^{n_r} |h_{rl}(i)|^2 \right)^{p/2} \tag{14}$$

under the constraint that $A^h = b$ where h is defined as the concatenated vector of all channels to be $\underline{h}^T = [h_{11}{}^T h_{12}{}^T \ldots h_{1n_t}{}^T \ldots h_{n_r1}{}^T h_{n_r2}{}^T \ldots h_{n_rn_t}{}^T]$ be the combined observation vector which is defined as $b^T = [b_{11}{}^T b_{12}{}^T \ldots b_{1n_t}{}^T \ldots b_{n_r1}{}^T b_{n_r2}{}^T \ldots b_{n_rn_t}{}^T]$ and where A is a block diagonal matrix with matrices $A_{ij}$s on its diagonal as shown below:

$$A = \begin{bmatrix} A_{11} & 0 & \ldots & 0 \\ 0 & A_{12} & 0 & \ldots \\ 0 & 0 & \ddots & 0 \\ 0 & \ldots & 0 & A_{n_rn_t} \end{bmatrix}.$$

When p<2, the above metric is well known to identify sparse signals. We consider the following Lagrangian function $$L(\underline{h},v) = J^{(p)}(\underline{h}) + v^T(A\underline{h} - b).$$

We have $$\frac{\partial J^{(p)}(\underline{h})}{\partial h_l(i)} = p \left( \sum_{r=1}^{n_r} \sum_{l=1}^{n_t} |h_{rl}(i)|^2 \right)^{(p-2)/2} h_l(i) \tag{15}$$

$$= p \|\underline{h}^{[i]}\|^{p-2} h_l(i) \tag{16}$$

where $\|h^{[i]}\|^2 = \sum_{r=1}^{n_r} \sum_{l=1}^{n_t} |\underline{h}((r-1)n_tL + (l-1)L + i)|^2$. Therefore the gradients of the Lagrangian are $$\frac{\partial \mathcal{L}}{\partial \underline{h}} = p\Pi\underline{h} + A^T v \tag{17}$$

$$\frac{\partial \mathcal{L}}{\partial v} = A\underline{h} - b \tag{18}$$

Π is defined as $\Pi(h) = D(h) \otimes I_{n_tn_r}$ where $$D(\underline{h}) = \text{diag}\left( \left( \|\underline{h}^{[i]}\|^2 \right)^{(p-2)/2} \right)$$

$$= \text{diag}\left( \left( \sum_{l=1}^{n_t} \sum_{r=1}^{n_r} |h_{rl}(i)|^2 \right)^{(p-2)/2} \right).$$

Setting (17) and (18) equal to 0 and solving for h, the optimal value of h has to satisfy the following equation.

$$\underline{h} = \Pi^{-1}(\underline{h})A^T(A\Pi^{-1}(\underline{h})A^T)^{-1}b \tag{19}$$

This equation can be used to construct an iterative algorithm with an update equation as follows:

$$\underline{h}_{k+1} = \Pi^{-1}(\underline{h}_k)A^T(A\Pi^{-1}(\underline{h}_k)A^T)^{-1} \tag{20}$$

Here $\Pi(\underline{h})=D(\underline{h})\otimes I_{n_t n_r}$ where $$D = \text{diag}\left(\left(\sum_{l=1}^{n_t}\sum_{r=1}^{n_r}|h_{rl}(i)|^2\right)^{(p-2)/2}\right).$$

The algorithm can be terminated after running for a fixed number of iterations or when $$\frac{\|\underline{h}_{k+1} - \underline{h}_k\|^2}{\|\underline{h}_k\|^2} < \epsilon.$$

5.2 Maching Pursuit (MP) and Orthogonal Maching Pursuit (OMP)

OMP can be derived as follows. At the pth iteration, choose a column that minimizes the weighted sum of q-norm of the residues where q>0. That is, the index of the selected column during pth iteration is $$k_p = \arg\min_j \min_h \|b - [C^{p-1}[A]_j]h\|^q \quad (21)$$

$$= \arg\min_j \|P^\perp_{C^p(j)} b\|^q \quad (22)$$

$$= \arg\min_j \left\|b_1 - P_{C^{p-1}(j)} b - P_{[A^{p-1}]_j} b\right\|^q \quad (23)$$

$$= \arg\min_j \omega_1 \left\|b_1^{p-1} - P_{[A^{p-1}]_j} b^{p-1}\right\|^q \quad (24)$$

$$= \arg\min_j \omega_1 \left\|b_1^{p-1} - [A^{p-1}]_j ([A]_j^{(p-1)\dagger} b^{p-1})\right\|^q \quad (25)$$

$$= \arg\min_j \omega_1 \left(\|b_1^{p-1}\|^2 - |[A]_j^{(p-1)\dagger} b^{p-1}|^2\right)^{\frac{q}{2}} \quad (26)$$

where $P_W$ and $P_W^\perp$ are the standard projection operations given by $P_W = W(W^\dagger W)^{-1} W^\dagger$, $P_W^\perp = I - W(W^\dagger W)^{-1} W^\dagger$, and $C_i^{p-1}$ is the matrix whose columns contain the selected columns of $A_i$ till (p−1)th iteration.

$$C^p(j) = [C^{p-1}[A]_j]$$

and $$[A^{p-1}]_j = P_{C^{p-1}}^\perp [A]_j.$$

Following are the step-by-step procedures for the proposed algorithm.

Initialization: The residue is initialized as $b^0 = b$ and the generating matrix is initialized as $A^0 = A$.

Tap Detection: The column selection metric can be obtained by thing q=2 in (26). In the pth iteration, the column selection metric becomes $$k_p = \arg\max_j |[A]_j^{(p-1)\dagger} b^{p-1}|^2 \quad (27)$$

Update: The set of selected columns is updated as $C^p(j) = [C^{p-1}[A^p]_{k_p}]$. The residue $b^p$ is calculated as $$b^p = (I - P_{C^p}) b^{p-1} \quad (28)$$

The generating matrix is updated as $$A^p = nrm(P^\perp_{C^p} A_1^{p-1}) \quad (29)$$

where the nrm(.) is a function that normalizes the columns of the argument. We note that both the residue $b^p$ and the column of the updated generated matrix $A^p$ are orthogonal to the matrix $C^p$.

Stopping condition: The algorithm continues to iterate until the maximum number of iterations is reached or the norm of residue goes below a threshold, i.e. $\|b^p\|^2 \le \epsilon$. In systems with noise, $\epsilon$ is determined according to the signal to noise ratio (SNR). In general, the greater the SNR, the lower the value of $\epsilon$. In our numerical analysis, we assume $\epsilon = 0.01$ for the noiseless case.

Convergence: It is straightforward to notice that the algorithm converges since the metric (weighted squared norm residue) decreases with each iteration.

Tap gain regeneration: After determining the set of columns to represent the given observations, the estimate of the channels at the selected tap positions are obtained through $$\left(C_i^{p\dagger} C_i^p\right)^{-1} C_i^{p\dagger} b_i.$$

For the case of noisy observations, the pseudo inverse can be replaced by a regularized inverse. That is, the tap values for the selected column indices can be obtained from $$\left(C_i^{p\dagger} C_i^p + \frac{1}{SNR} I\right)^{-1} C_i^{p\dagger} b_i.$$

We refer to this version as MSE based orthogonal MP.

Remark: No update for generating matrices A careful analysis of the MIMO MP algorithm reveals that the update stage involves the maximum complexity. The complexity is especially significant when the number of channels is large since each and every matrix needs to be updated. A simple solution is to avoid updating the generating matrix, i.e., $$A_i^p = A_i \, \forall p.$$

This does not affect the orthogonality of the residue with respect to the previously selected columns and therefore the convergence of the algorithm is not affected. We refer to this algorithm as OMP2 while the original algorithm is referred to as OMP1.

MP is a simpler version of the algorithm where the orthogonalization step is not performed. In other word, the initialization and tap detection steps are the same as OMP while in the update step we have $$A_i^p = A_i \, \forall \, p. \quad (30)$$

and $$b^p = \left(I - P_{[A^p]_{k_p}}\right) b^{p-1}$$

6 Canceling Signal Generation

The optimal solution to the problem of sparse channel estimation is obtained through L0 norm optimization that is combinatorial and its complexity is prohibitive. Different approaches have been considered in literature to address this problem with reasonable complexity that can be implemented in practical systems. By using a proper choice of the sparse signal recovery algorithm, e.g., OMP, the solution to this problem, i.e., $\{\alpha_p^{ji}, \tau_p\}_{p=1}^T$ for all links from the transmit antenna i to receive antenna j in equation (10), can then be used to generate the canceling signal. Let $$x_i(t) = x_P^i(t) + x_S^i(t) \tag{31}$$

denote the signal transmitted from the transmit antenna i, where $x_P^i(t)$ is the part of the signal that contain the pilots and $x_P^i(t)$ is the part of the signal that contain the actual transmitted data. The canceling signal is generated as $$x_j(t) = \gamma \sum_{i=1}^{n_t} \sum_{p=1}^{T} \alpha_p^{ji} x_S^i(t - \tau_p T_s) + \beta \sum_{i=1}^{n_t} \sum_{p=1}^{T} \alpha_p^{ji} x_P^i(t - \tau_p T_s) \tag{32}$$

Figure 4A:
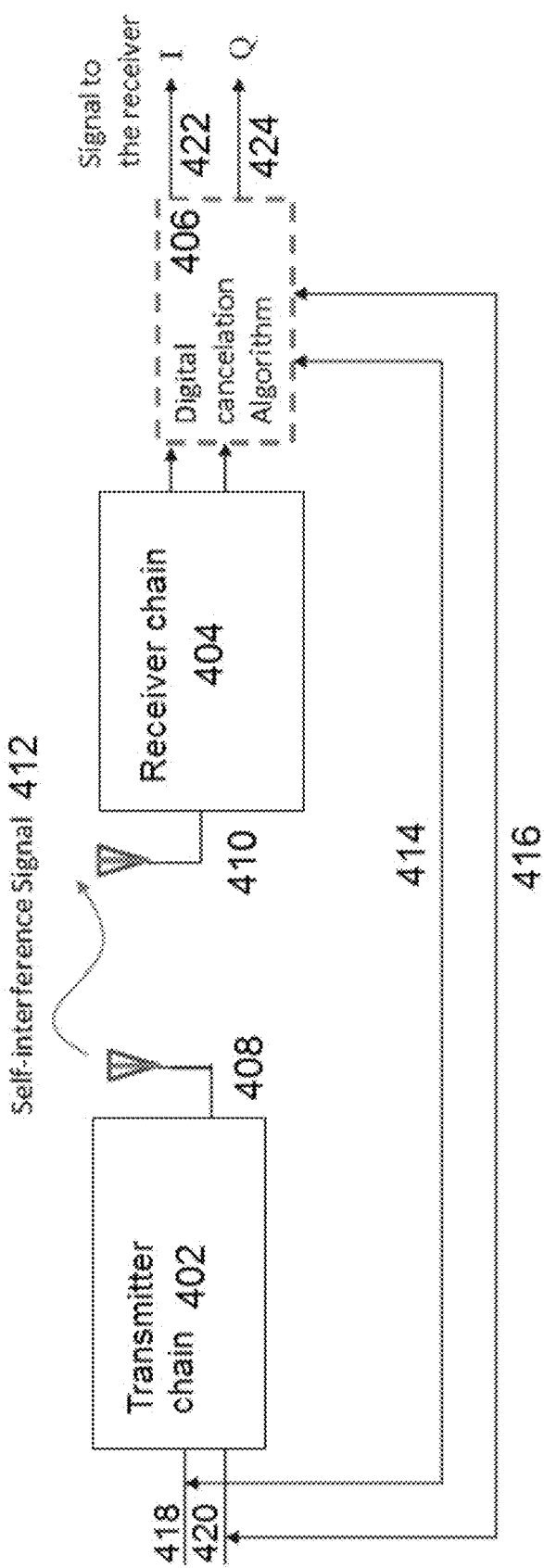
FIG. 4A depicts digital cancelation scenario I: Cancelation in digital domain. Two way communications between a digital cancellation algorithm and a transmitter chain are illustrated: (1) Digital cancellation algorithm receives a transmitted signal and (2) transmits a pilot signal.

Please note that T is the sparsity of the channel between each pair of antennas. This means that the number of taps between each pair of antennas is not more than T and hence some of the values of $\alpha_p^{ji}$ may be zero. The parameters $\gamma$ and $\beta$ depend on the gain of AGC and other components in the transmit and receive RF chain as well as the digital cancellation model (FIG. 4-FIG. 6). In the basic digital cancellation model depicted in FIG. 4A, the canceling signal is generated in digital domain and also subtracted from the received signal in the digital domain. In this case, we have $\gamma 32$ $\beta=1$.

Figure 4B:
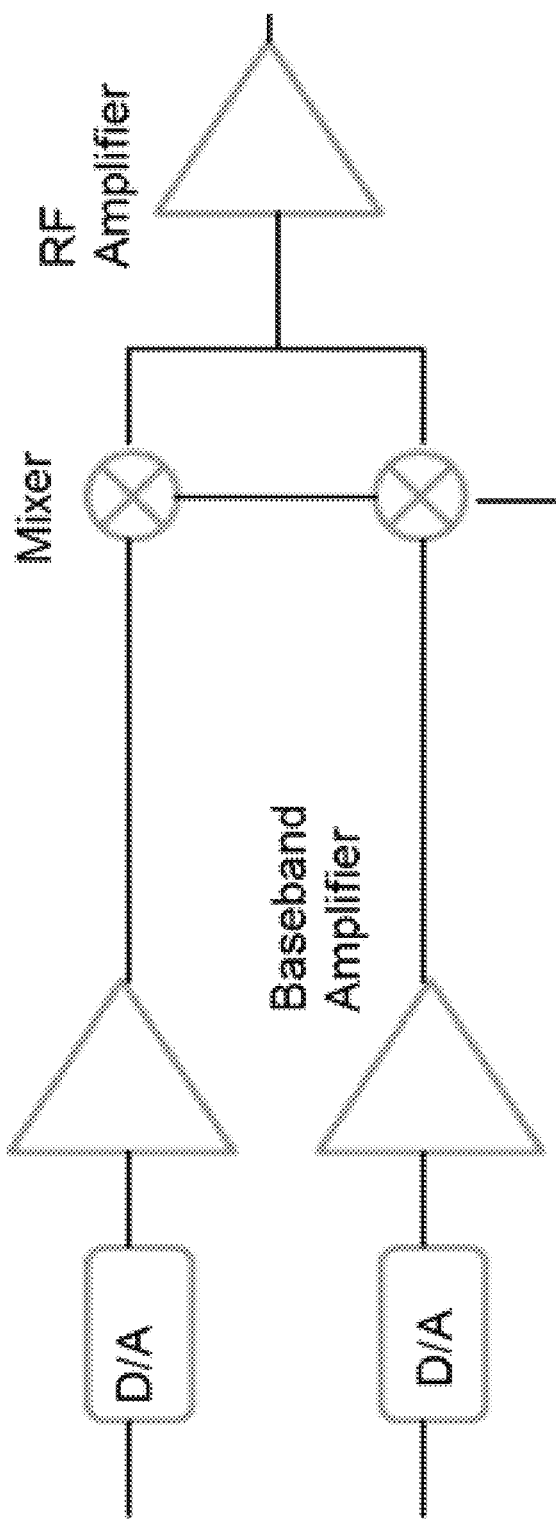
FIG. 4B depicts an example of a transmitter chain in FIGS. 4A, 5A, and 6A.
Figure 4C:
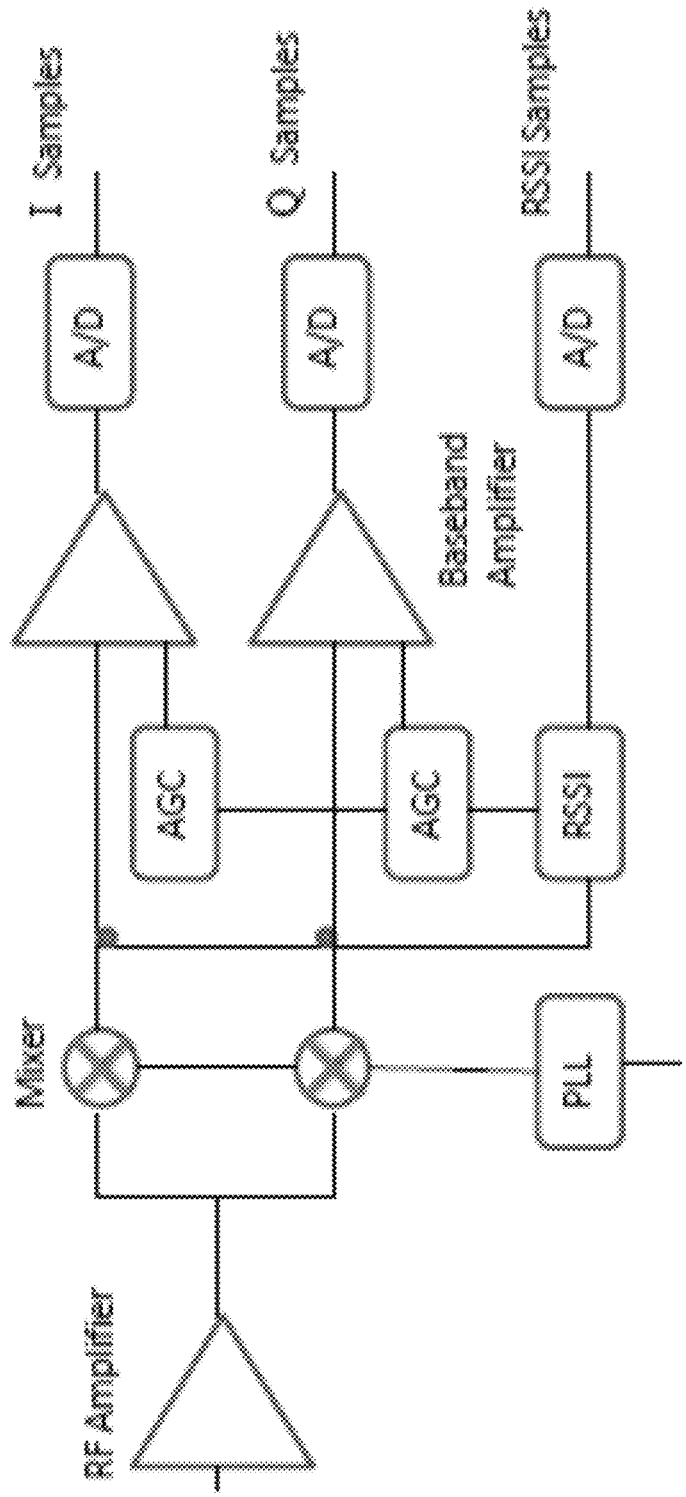
FIG. 4C depicts an example of a receiver chain in FIGS. 4A and 5A.

Referring to FIG. 4A, transmitter chain 402 and receiver chain 404 are connected to transmit antenna 408 and receive antenna 410, respectively. Receive antenna 410 receives self-interference signal 412 from transmit antenna 408. Self-interference signal 412 is cancelled by digital cancellation algorithm 406 and output I (in phase) 422 and output Q (quadrature) 424 are sent to the receiver (not shown). Also shown in FIG. 4A are two-way communications between inputs 418 and 420 to transmitter chain 402 and digital cancellation algorithm 406: Two way communications between a digital cancellation algorithm and a transmitter chain are illustrated: (1) Digital cancellation algorithm receives a transmitted signal and (2) transmits a pilot signal. An example of transmitter chain 402 in FIG. 4A is shown in FIG. 4B and an example of receiver chain 404 in FIG. 4A is shown in FIG. 4C.

In a more effective implementation of digital cancellation, the generated canceling signal in digital domain is converted to analog signal and then subtracted from the analog received signal prior to baseband amplification and digital to analog conversion. Although in this process some noise may be added to the system particularly due to baseband amplification in the canceling signal path, this technique is more effective mainly because of two reasons. First, this technique, i.e., digital cancellation in analog domain, eliminates or reduces the effect of receiver saturation due to limited dynamic range of ADC. Second, the reduction of self interference causes better accuracy of digital signal and lower quantization noise which in turn causes better generation of the canceling signal; this feedback process usually works to the extent of enhancing SIR to more than 0 dB under the condition that the SIR at the start of this process is high enough; this also depends on the resolution of the ADC FIG. 5A illustrates the block diagram of digital cancellation in analog domain.

Figure 5A:
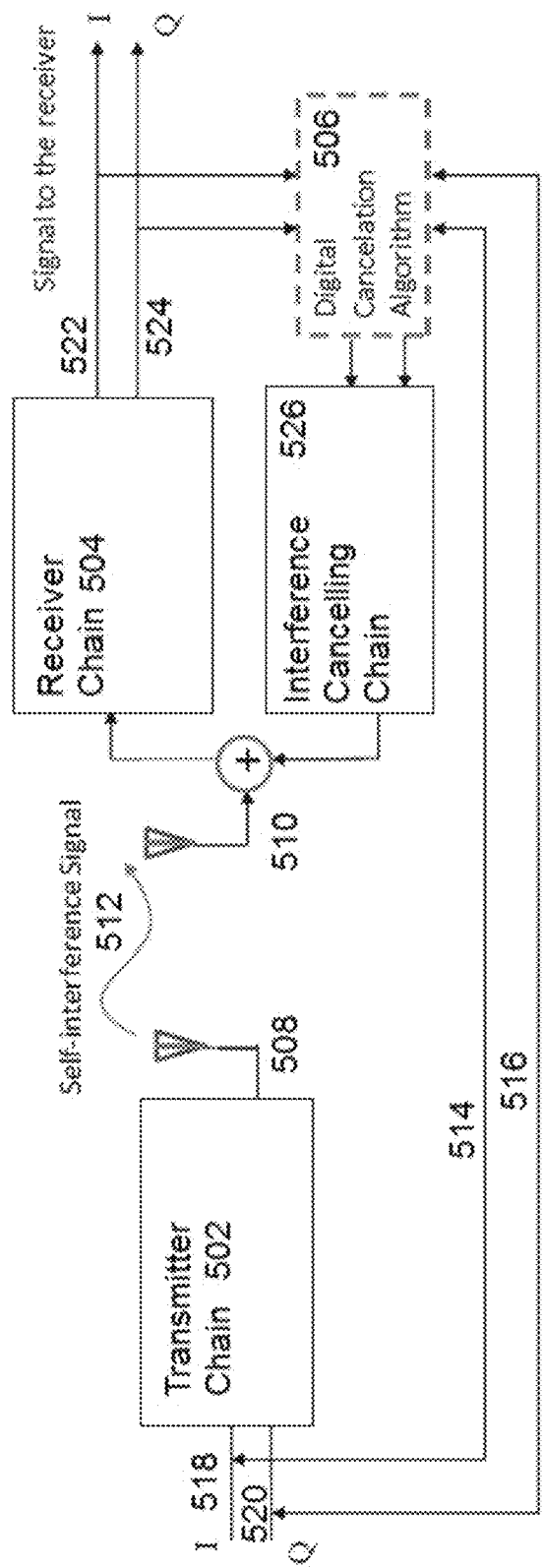
FIG. 5A depicts digital cancelation scenario II: Cancelation in analog RF domain. Two way communications between a digital cancellation algorithm and a transmitter chain are illustrated: (1) Digital cancellation algorithm receives a transmitted signal and (2) transmits a pilot signal.
Figure 5B:
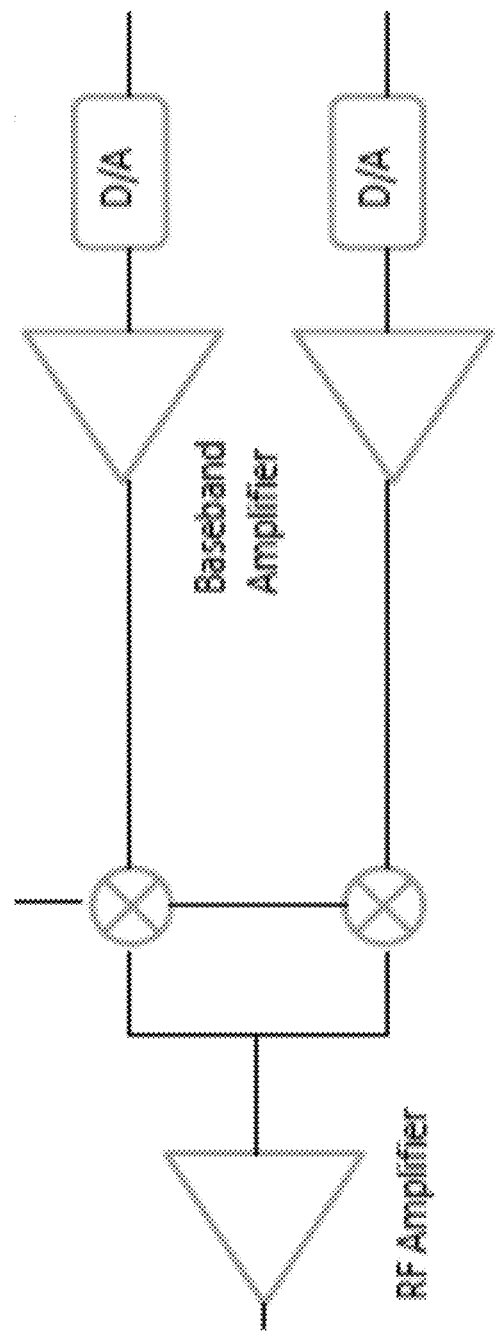
FIG. 5B depicts an example of an interference cancelling chain in FIG. 5A.

Referring to FIG. 5A, transmitter chain 502 and receiver chain 504 are connected to transmit antenna 508 and receive antenna 510, respectively. Receive antenna 510 receives self-interference signal 512 from transmit antenna 508. Self-interference signal 512 is cancelled by digital cancellation algorithm 506 through interference cancelling chain 526 and output I (in phase) 522 and output Q (quadrature) 524 are sent to the receiver (not shown). An output of interference cancelling chain 526 is fed back to an input of receiver chain 504. Also shown in FIG. 5A are two-way communications between inputs 518 and 520 to transmitter chain 502 and digital cancellation algorithm 506: Two way communications between a digital cancellation algorithm and a transmitter chain are illustrated: (1) Digital cancellation algorithm receives a transmitted signal and (2) transmits a pilot signal. An example of transmitter chain 502 in FIG. 5A is shown in FIG. 4B and an example of receiver chain 504 in FIG. 5A is shown in FIG. 4C. An example of interference cancelling chain 526 in FIG. 5A is shown in FIG. 5B.

In this implementation, the canceling signal is generated in RF and there are a total of four amplifiers and two mixers in each I (in phase) and Q (quadrature) path. The gains of these active devices have to be taken into account in adjusting $\beta$ and $\gamma$. In case these gains are coarsely quantized or not properly fedback to the digital canceling algorithm, the value of $\beta$ and $\gamma$ might incur intolerable error and may causes digital cancellation algorithm to fail. However, if these gains are constant it is easy to incorporate these gains by estimating the gain and delay (if any) of the canceling signal loop directly. Another drawback of this setup is the existence of several noise sources in the loop particularly the four amplifiers in either I or Q loop. The noise of the RF stage amplifier is in fact amplified by the baseband amplifier along with the useful signal.

Figure 6A:
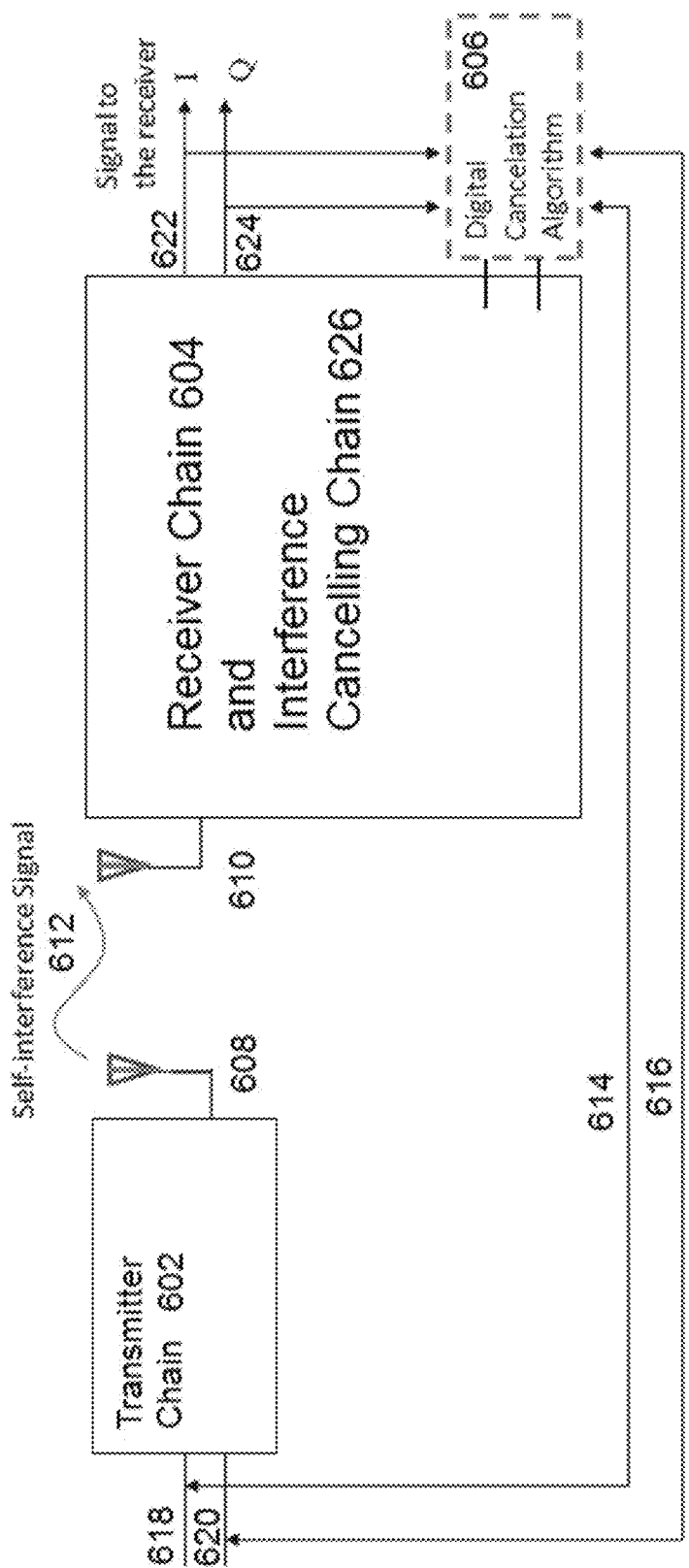
FIG. 6A depicts digital cancelation scenario III: Cancelation in analog baseband domain. Two way communications between a digital cancellation algorithm and a transmitter chain are illustrated: (1) Digital cancellation algorithm receives a transmitted signal and (2) transmits a pilot signal.

To avoid the cascaded effect of the noise amplification in the canceling loop, a better strategy is to combine the canceling signal in the baseband prior to the baseband amplifier and ADC as depicted in FIG. 6A. The reason is that in this scheme the receiver saturation can be avoided and the positive feedback in the generation of the canceling signal can be exploited while the noise remains within tolerable level. Moreover, by using received signal strength indicator (RSSI) feedback to automatically control AGCs in both the receiver path and the canceling path, the value of the $\gamma$ and $\beta$ can be made independent of time and cancellation level.

Referring to FIG. 6A, transmitter chain 602 and receiver chain 604 are connected to transmit antenna 608 and receive antenna 610, respectively. Receive antenna 610 receives self-interference signal 612 from transmit antenna 608. Self-interference signal 612 is cancelled by digital cancellation algorithm 606 through interference cancelling chain 626 and output I (in phase) 622 and output Q (quadrature) 624 are sent to the receiver (not shown). An output of interference cancelling chain 626 is fed back to receiver chain 604. Also shown in FIG. 6A are two-way communications between inputs 618 and 620 to transmitter chain 602 and digital cancellation algorithm 606: Two way communications between a digital cancellation algorithm and a transmitter chain are illustrated: (1) Digital cancellation algorithm receives a transmitted signal and (2) transmits a pilot signal.

Figure 6B:
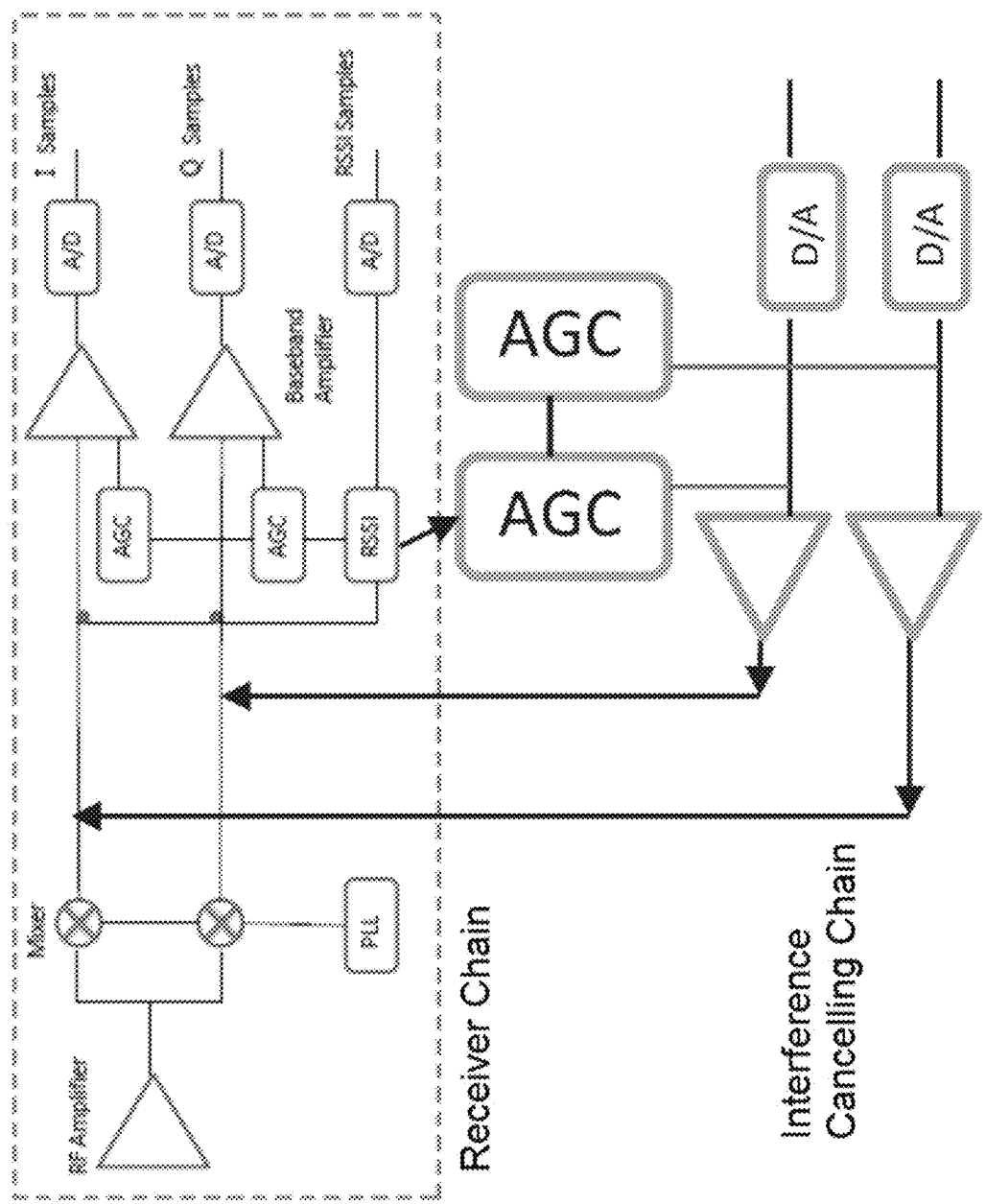
FIG. 6B depicts an example of a receiver chain and an interference cancelling chain in FIG. 6A.

An example of transmitter chain 602 in FIG. 6A is shown in FIG. 4B and an example of receiver chain 504 and interference cancelling chain 626 in FIG. 6A is shown in FIG. 6B.

For both scenarios of digital cancellation in analog domain shown in FIG. 5A and FIG. 6A, the value of $\gamma$ is set such that the received data signal (without pilots) have the same power as the canceling signal at the input of the ADC. The value of $\beta$ is set differently. While the SIR is smaller than a threshold (usually between 0 dB and 10 dB) the value of $\gamma$ is set such that only 80% of the power of the pilot signals are diminished. This creates an effect that ensures that the pilot signals are not suppressed completely while their contribution on reducing the total input power and enhancing the digitization process is preserved. Beyond this SIR threshold we do not further suppress the pilot signals and keeps their power at almost the same level. The reason is that for high SIR it is important to enhance the self-interference channel estimation. Moreover, the reduction of the self-interference (including pilot signals) does not affect the ADC performance. Therefore, it is only desirable to reduce the actual self interference in all subchannels where the data transmission and reception happens and the pilots may be kept without power reduction.

We note that all subcarriers may be used as a pilot for estimation as long as there is no interference on these subcarriers from other sources. This means that in the intervals that no other source transmits on part of the subcarriers in addition to ones that are reserved for pilots, these subcarriers (that may even contain data intended for some other users) can also contribute to the estimation process to enhance the resolution of the estimation of the self-interference channel.

Figure 7:
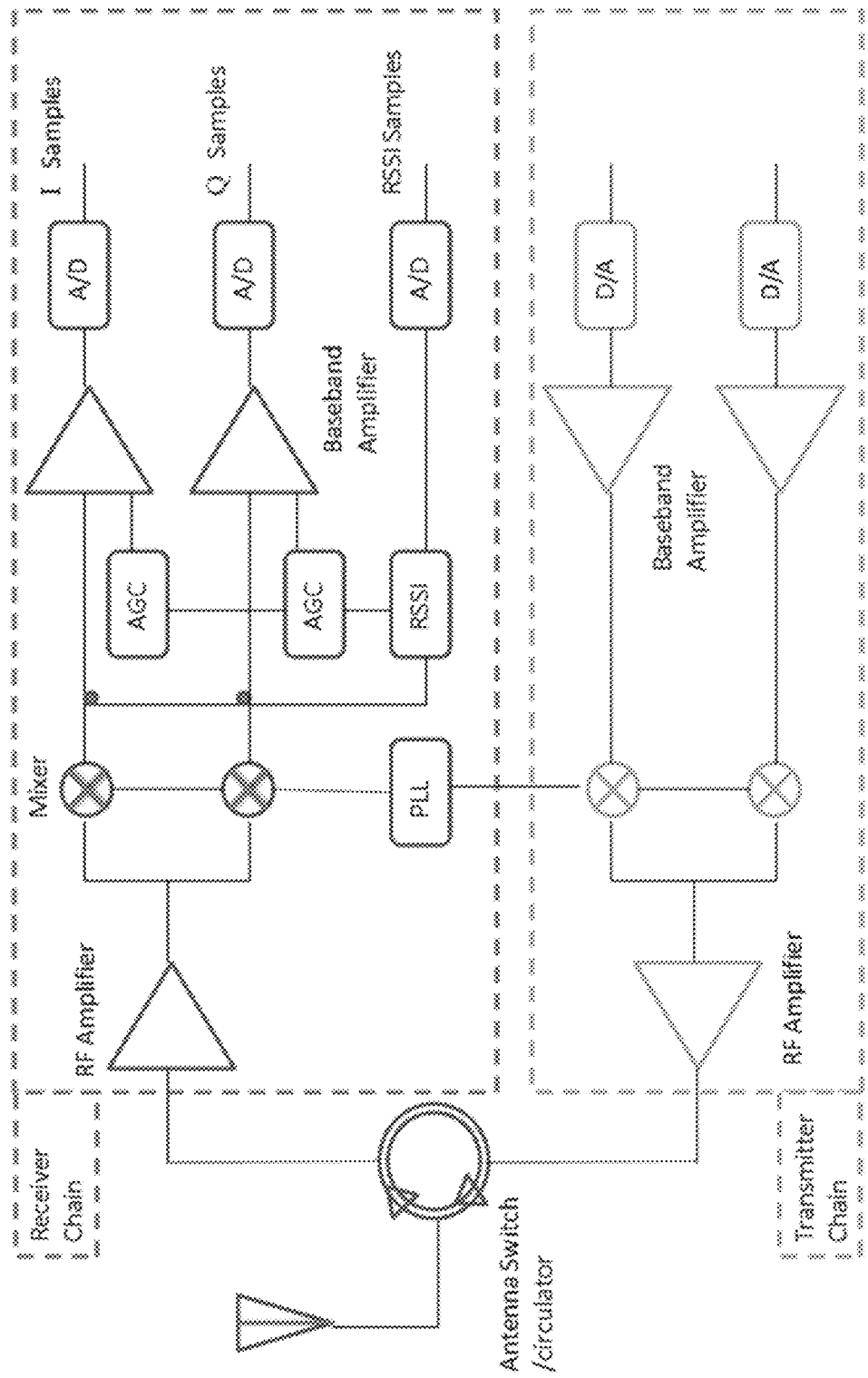
FIG. 7 depicts a block diagram of a typical transmit and receive RF chain.

FIG. 7 shows a typical transmit and receive RF chain. In order to nd the appropriate values fr $\beta$ and $\gamma$ is it imperative to consider the characteristics of the different components in the transmit and receive RF chain and in particular their gain, delay, and possible nonlinear effects. We note that in order to take advantage of the best quantization resolution of ADC, the AGC has to be enabled. Moreover, the feedback of the canceling signal with appropriate phase and gain has to be received somewhere before the AGC in the receive RF chain in order to achieve the resolution enhancement though digital cancelation algorithm.

7 Simulation Results

In this section we provide numerical result comparing the performance of different sparse recovery algorithms, prticularly matching pursuit algorithms and L1-norm minimization based algorithms.

Pilot placement is a critical design parameter. Often, a random pilot placement performs well.

The following fixed pilot positioning scheme is proposed. Starting with the first subcarrier, the pilots are chosen such that the interval between two adjacent pilot subcarriers increase by one. The procedure is followed until we exceed M/2 subcarriers. The remaining pilots are placed at the end of the symbol. For M=10 and Q=5, the pilot position set is {1, 2, 4, 7, 10}. We will also consider this positioning in our simulations.

Performance Metrics

We consider two metrics as basis for comparison in our analysis. The first metric is the accuracy that is defined as the success rate of the algorithm in correctly identifying the channel. In our simulations, we say that an estimate is accurate if the norm of the estimation error is less than 0.01.

For the noisy system model, we use mean squared error performance of the estimator as the metric for comparison.

Regarding the channel models, we consider the following two cases: In the first case, the channel is generated by choosing T nonzero tap positions randomly among L positions. The nonzero taps are independent and identically distributed (i.i.d.) CN (0, 1). We also use the spatial channel model (SCM) for generating the continuous time domain inter symbol interference (ISI) channel in the form given in (10).

The SCM outputs 6 channel taps and their corresponding path delays. The path delays may not be a multiple of the symbol duration, which we assume it to be the inverse of the signal bandwidth. We find an equivalent discrete time channel using (11) assuming the pulse shaping filter to be a square pulse of duration equal to the symbol period, i.e. g(t)=1,t=[0, Ts] and zero otherwise.

Accuracy Performance

Figure 8:
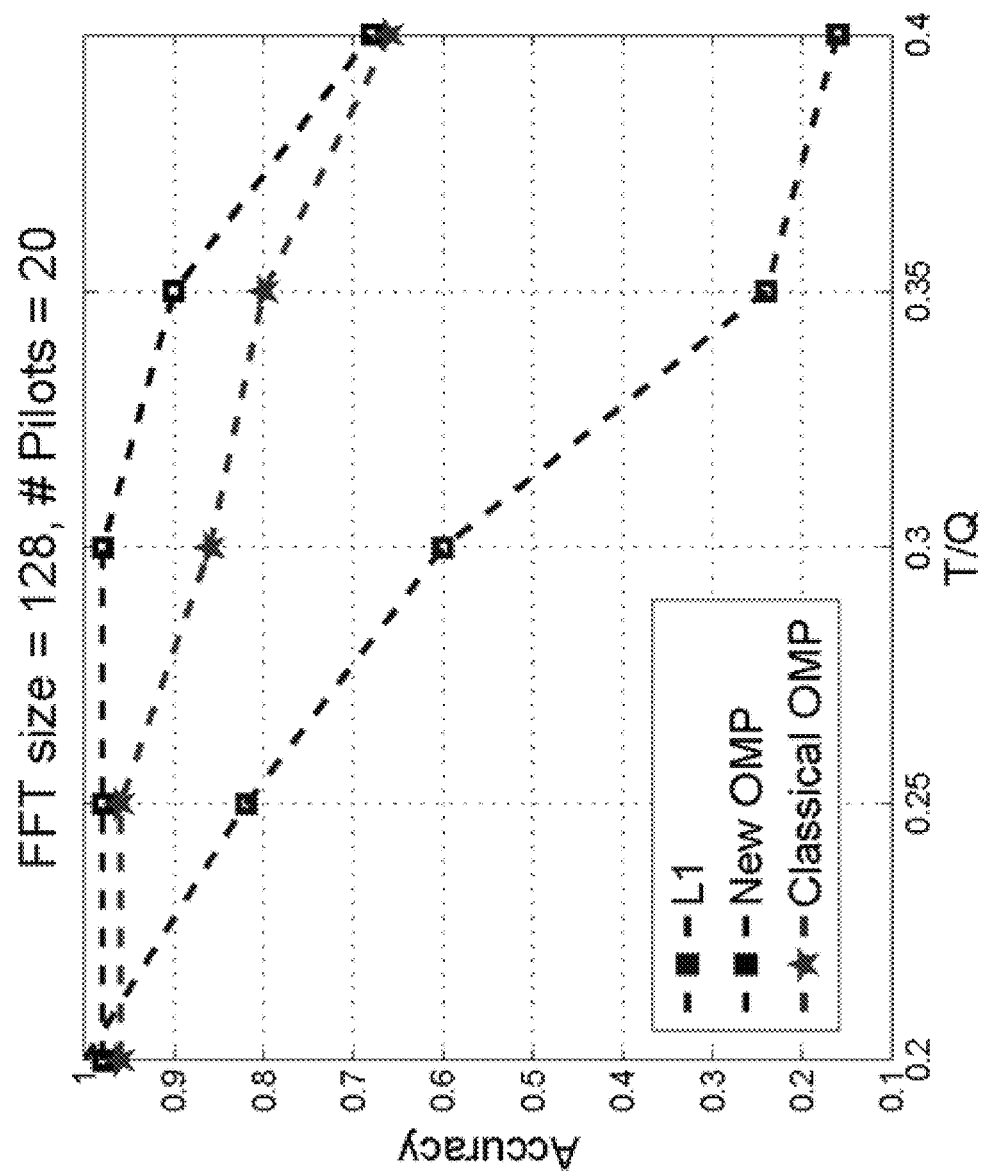
FIG. 8 depicts accuracy performance of sparse channel estimation with 20 dB INR.

In FIG. 8, we compare the sparsity exploiting schemes for the case of noiseless observations. We use random pilot positioning by randomly choosing Q pilots out of M subcarriers. We fix the pilot positions and generate 50 different channel tap positions and gains. In order to model practical and realistic impulse response, we assume the time domain impulse response to be nonzero in the entire period of one OFDM symbol beside the position of the nonzero taps and its average power at any position beside the position of the dominant channel taps is -20 dB lower than the average power at the position of the taps. In FIG. 8, we plot the accuracy performance as a function of T/Q where T is the sparsity of the channel. Theoretically, it should be possible to obtain perfect accuracy as long as T/Q is less than 0.5. The scheme "classical OMP" in FIG. 8 refers to the orthogonal matching pursuit considered in this work which is the same as the OMP algorithm. The scheme "new OMP" is similar to "classical OMP" except that the columns of the generating matrices are not modified and kept constant through out the algorithm. The scheme "new OMP" performs close to "classical OMP" while L1 minimization is the worst performing scheme among the three schemes.

Typical Channel Response

Figure 9:
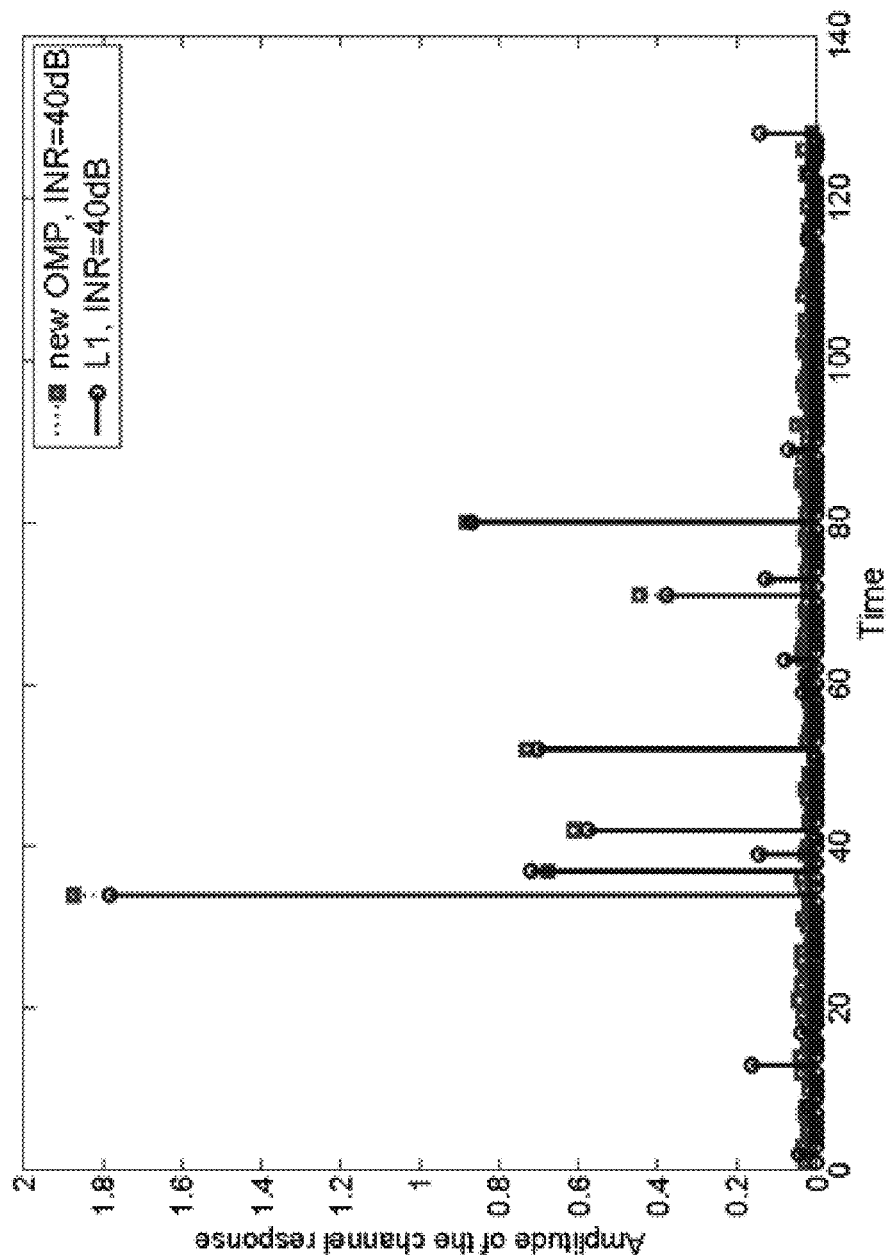
FIG. 9 depicts a typical channel impulse response and its sparsity.

FIG. 9 illustrates a typical time domain channel impulse response after sampling. The same figure also shows the result of the sparse signal recovery algorithm "new OMP". It can be observed that "new OMP" in fact finds only few nonzero channel taps that correspond to the dominant channel taps. However, th scheme "new OMP" ignores all the small taps that are in fact either reflection from very far objects or noise of the receiver RF chain. Nonetheless, OMP2 sometimes replaces some of the small gain taps with single larger taps in some positions.

Mean Square Error (MSE) Performance

Figure 10:
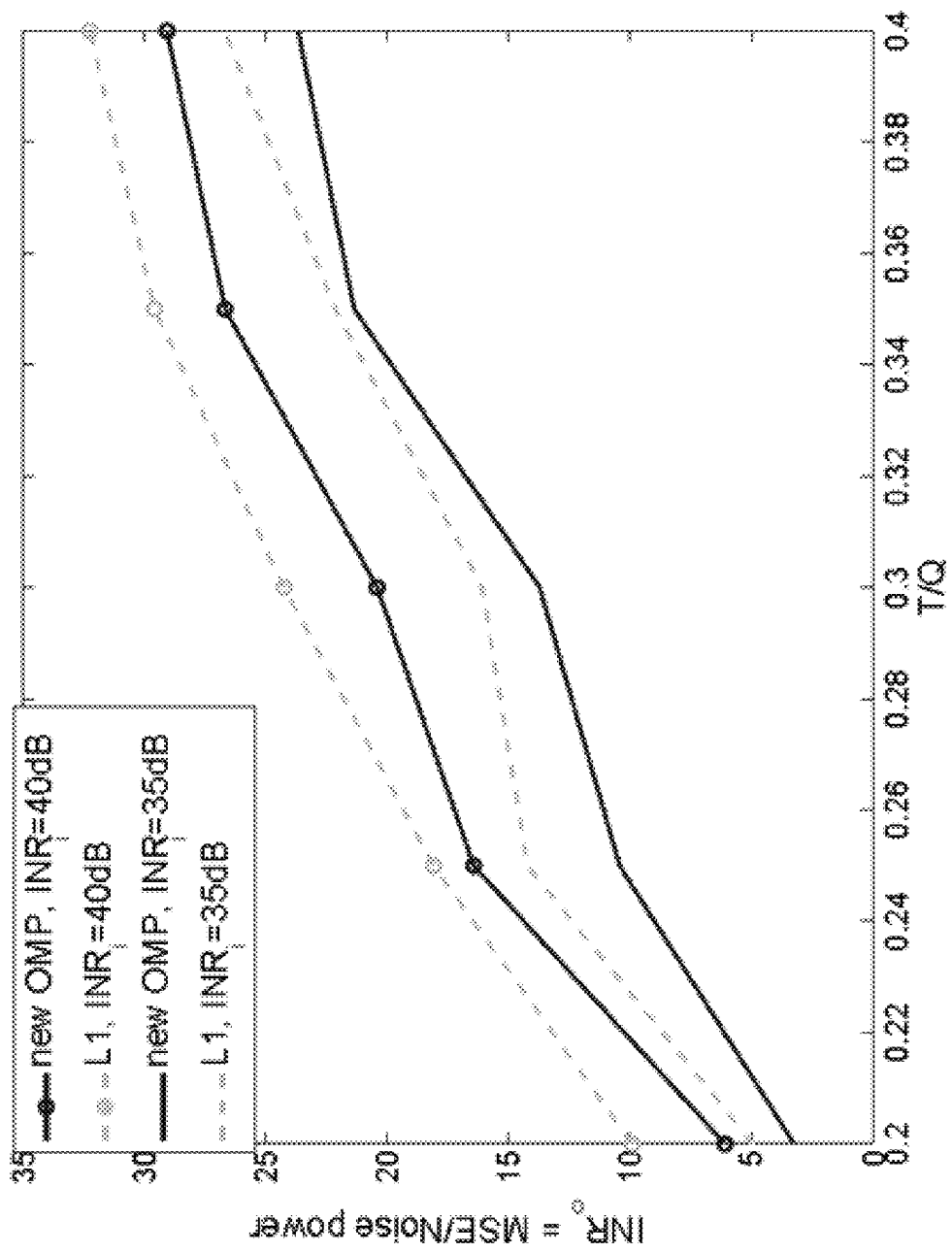
FIG. 10 depicts output INR of after digital cancelation as a function of input INR and number of observations.

FIG. 10 illustrates the MSE performance of the two algorithms "new OMP" and L1-norm sparse signal recovery. We consider two different self-interference to noise ratio (INR$_i$) of 30 dB and 35 dB at the input of the digital noise canceler. It is observed that even though accuracy is better for "new OMP" algorithm, the MSE error performance is quickly degrades when the number of pilots is decreased. In other words, it is required that a much lower T/Q ratio be used in order to considerably lower the output INR defined as $$INR_o = \frac{MSE}{\text{Noise Power}}.$$

8 Conclusion

We considered the problem of digital cancellation of self-interference for the purpose of enabling full duplex communication. While the transmitted signal is known, the self interference signal is not fully known to the transmitter due to the fact that it goes through a multipath fading channel and multiple replica of the signal is received at the receive antenna each with different gain and phase. We discussed the limitation of existing digital cancellation methods to provide self-interference cancellation. We presented efficient algorithms for self-interference cancellation that can be used in wideband and frequency selective channels as well as narrowband and frequency flat channels. We provided design guidelines and a specific digital cancelation system that can effectively cancel out self-interference cancellation. The proposed system has the advantage of being able to enhance its effective resolution and achieve larger dynamic range by feeding back the canceling signal prior to analog to digital converter. We also addressed wideband digital cancellation by using the theory of sparse signal recovery and provided an algorithm to efficiently estimate and regenerate the self-interference signal.

In our system, the feedback of the canceling signal, especially to somewhere prior to the AGC (automatic gain control) unit, enables achieving better resolution for the ADC and use its full potential.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A communications apparatus used in a wireless full duplex system, the communications apparatus comprising:
    a receiver chain connected to a receive antenna, the receiver chain comprising:
        a first baseband amplifier to amplify a receive signal in a receive path; and
        a first automatic gain controller to control the first baseband amplifier; and
    an interference cancelling chain,
    wherein one or more cancellation signals generated by the interference cancelling chain are fed back to the receiver chain prior to the first baseband amplifier which uses the first automatic gain controller; and
    a transmitter chain connected to a transmit antenna,
        wherein the interference cancelling chain is controlled by a digital cancellation algorithm according to an input of the transmitter chain and an output of the receiver chain; and
        wherein the digital cancellation algorithm adjusts a fast Fourier transform (FFT) resolution to find a position of a time domain tap delay needed for said one or more cancellation signals.

2. The communications apparatus as in claim 1,
    wherein the receive signal comprises a receive I (in phase) signal and the receive path comprises a receive I (in phase) path,
    wherein the receiver chain connected to a receive antenna further comprises:
        a second baseband amplifier to amplify a receive Q (quadrature) signal in a receive Q (quadrature) path;
        a first analog-to-digital (A/D) converter to convert an output of the first baseband amplifier;
        a second analog-to-digital (A/D) converter to convert an output of the second baseband amplifier; and
        a second automatic gain controller to control the second baseband amplifier, and wherein the interference cancelling chain comprises:
            a first digital-to-analog converter to convert a cancelling I (in phase) signal in a cancelling I (in phase) path;
            a second digital-to-analog converter to convert a cancelling Q (quadrature) signal in a cancelling Q (quadrature) path;
            a third baseband amplifier to amplify an output of the first digital-to-analog converter; and
            a fourth baseband amplifier to amplify an output of the second digital-to-analog converter.

3. The communications apparatus as in claim 1, wherein said one or more cancellation signals are fed back to an input of the receiver chain.

4. The communications apparatus as in claim 1, wherein said one or more cancellation signals are fed back to and combined to a received baseband signal.

5. The communications apparatus as in claim 2,
    wherein said one or more cancellation signals comprise an output of the third baseband amplifier and an output of the fourth baseband amplifier, and
    wherein the output of the third baseband amplifier is fed back to an input of the first baseband amplifier in the receiver chain, and the output of the fourth baseband amplifier is fed back to an input of the second baseband amplifier in the receiver chain.

6. The communications apparatus as in claim 2, further comprising:
    a received signal strength indicator (RSSI) to control the first automatic gain controller in the receiver chain and the second automatic gain controller in the receiver chain,
    wherein the interference cancelling chain further comprises:
        a third automatic gain controller to control the third baseband amplifier;
        a fourth automatic gain controller to control the fourth baseband amplifier, and
    wherein the RSSI controls the third automatic gain controller in the cancellation chain and the fourth automatic gain controller in the cancellation chain.

7. The communications apparatus as in claim 1,
    wherein a signal received with the receive antenna includes a data signal and a pilot signal, and
    wherein said one or more cancellation signals has different levels of cancellation for the data signal and the pilot signal.

8. The communications apparatus as in claim 1,
    wherein said one or more cancellation signals are generated in a time domain.

9. The communications apparatus as in claim 1,
    wherein a signal received with the receive antenna includes a data signal and a pilot signal, and
    wherein the digital cancellation algorithm increases a fast Fourier transform (FFT) resolution in a compressed sensing algorithm without changing an FFT size or a position of the pilot signal.

10. A method implemented in a communications apparatus used in a wireless full duplex system, the method comprising:
    in a receiver chain connected to a receive antenna,
        amplifying, with a first baseband amplifier, a receive signal in a receive path; and
        controlling, with a first automatic gain controller, the first baseband amplifier,
            wherein one or more cancellation signals generated by an interference cancelling chain are fed back to the receiver chain prior to the first baseband amplifier which uses the first automatic gain controller;

controlling, with a received signal strength indicator (RSSI), the first automatic gain controller in the receiver chain and the second automatic gain controller in the receiver chain,
    wherein the interference cancelling chain further comprises:
        a third automatic gain controller to control the third baseband amplifier;
        a fourth automatic gain controller to control the fourth baseband amplifier, and
    wherein the RSSI controls the third automatic gain controller in the cancellation chain and the fourth automatic gain controller in the cancellation chain.

11. The method as in claim 10,
wherein the receive signal comprises a receive I (in phase) signal and the receive path comprises a receive I (in phase) path, further comprising:
    in the receiver chain connected to a receive antenna,
        amplifying, with a second baseband amplifier, a receive Q (quadrature) signal in a receive Q (quadrature) path;
        converting, with a first analog-to-digital (A/D) converter, an output of the first baseband amplifier;
        converting, with a second analog-to-digital (A/D) converter, an output of the second baseband amplifier; and
        controlling, with a second automatic gain controller, the second baseband amplifier; and
    in the interference cancelling chain,
        converting, with a first digital-to-analog converter, a cancelling I (in phase) signal in a cancelling I (in phase) path;
        converting, with a second digital-to-analog converter, a cancelling Q (quadrature) signal in a cancelling Q (quadrature) path;
        amplifying, with a third baseband amplifier, an output of the first digital-to-analog converter; and
        amplifying, with a fourth baseband amplifier, an output of the second digital-to-analog converter.

12. The method as in claim 10,
wherein said one or more cancellation signals are fed back to an input of the receiver chain.

13. The method as in claim 10,
wherein said one or more cancellation signals are fed back to and combined to a received baseband signal.

14. The method as in claim 11,
wherein said one or more cancellation signals comprise an output of the third baseband amplifier and an output of the fourth baseband amplifier, and
wherein the output of the third baseband amplifier is fed back to an input of the first baseband amplifier in the receiver chain, and the output of the fourth baseband amplifier is fed back to an input of the second baseband amplifier in the receiver chain.

15. The method as in claim 10,
wherein the interference cancelling chain is controlled by a digital cancellation algorithm according to an input of a transmitter chain connected to a transmit antenna and an output of the receiver chain.

16. The method as in claim 10,
wherein a signal received with the receive antenna includes a data signal and a pilot signal, and
wherein said one or more cancellation signals has different levels of cancellation for the data signal and the pilot signal.

17. The method as in claim 10,
wherein said one or more cancellation signals are generated in a time domain.

* * * * *